3,079,793
APPARATUS FOR COLLECTING AND ANALYZING SAMPLE FLUIDS

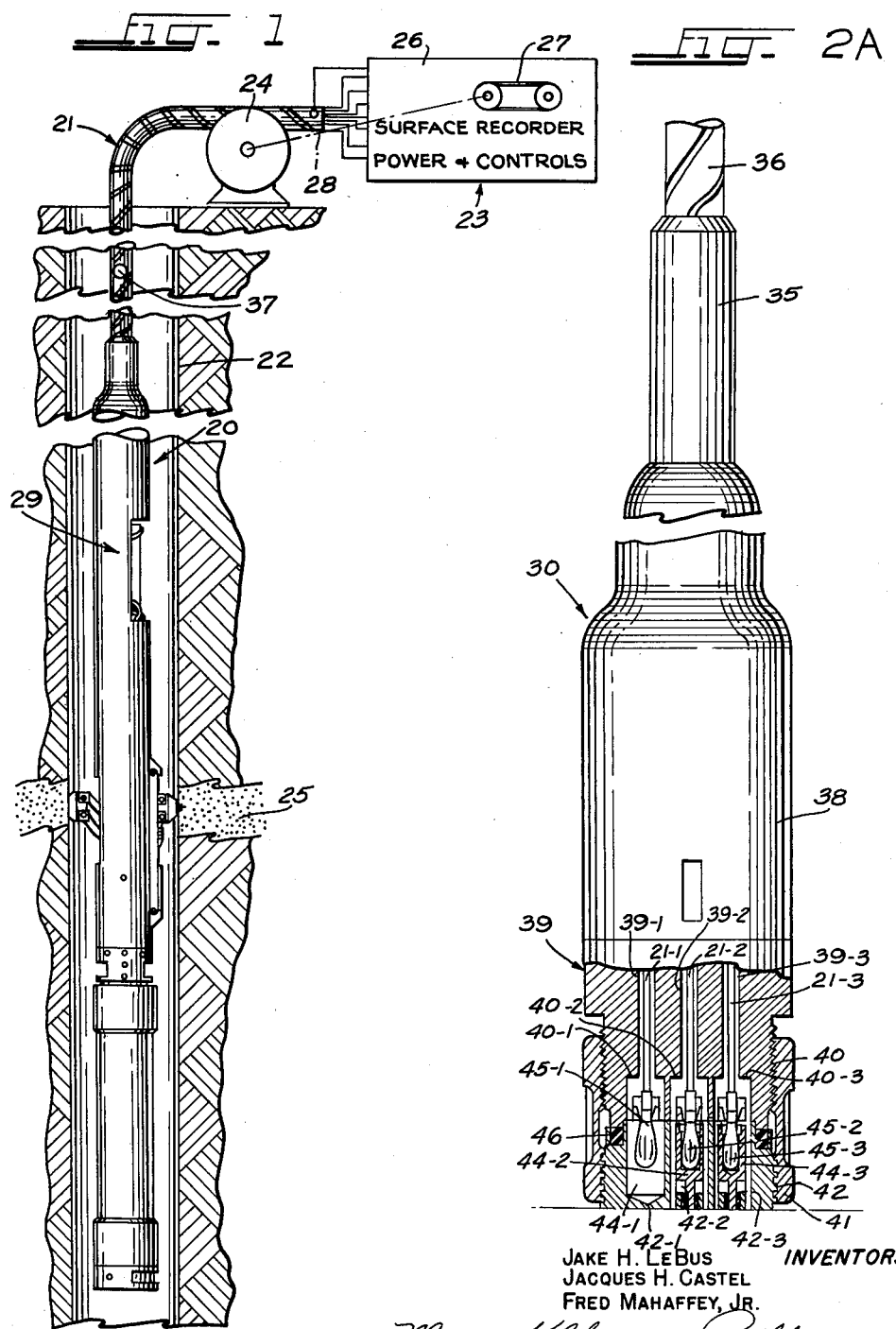

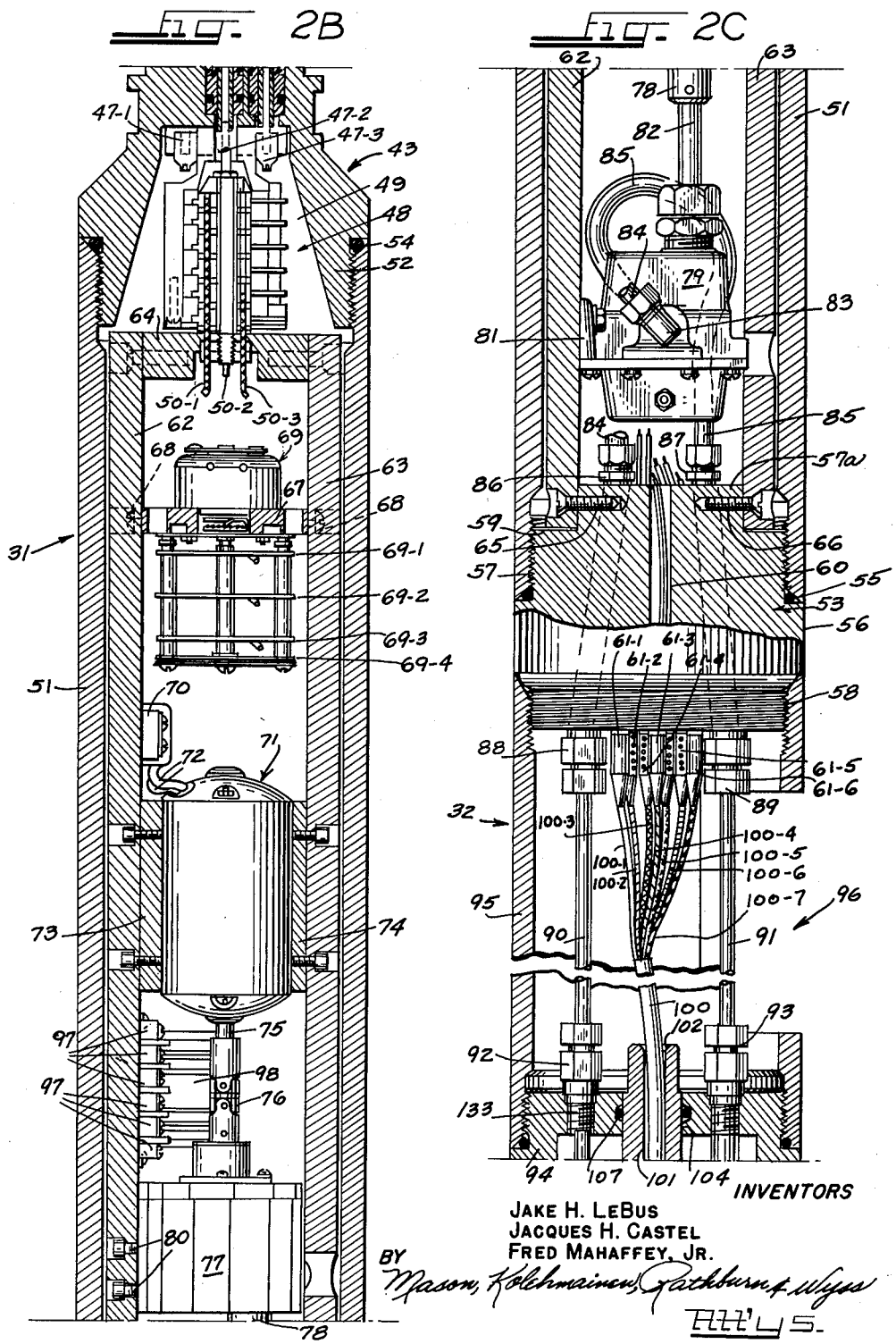

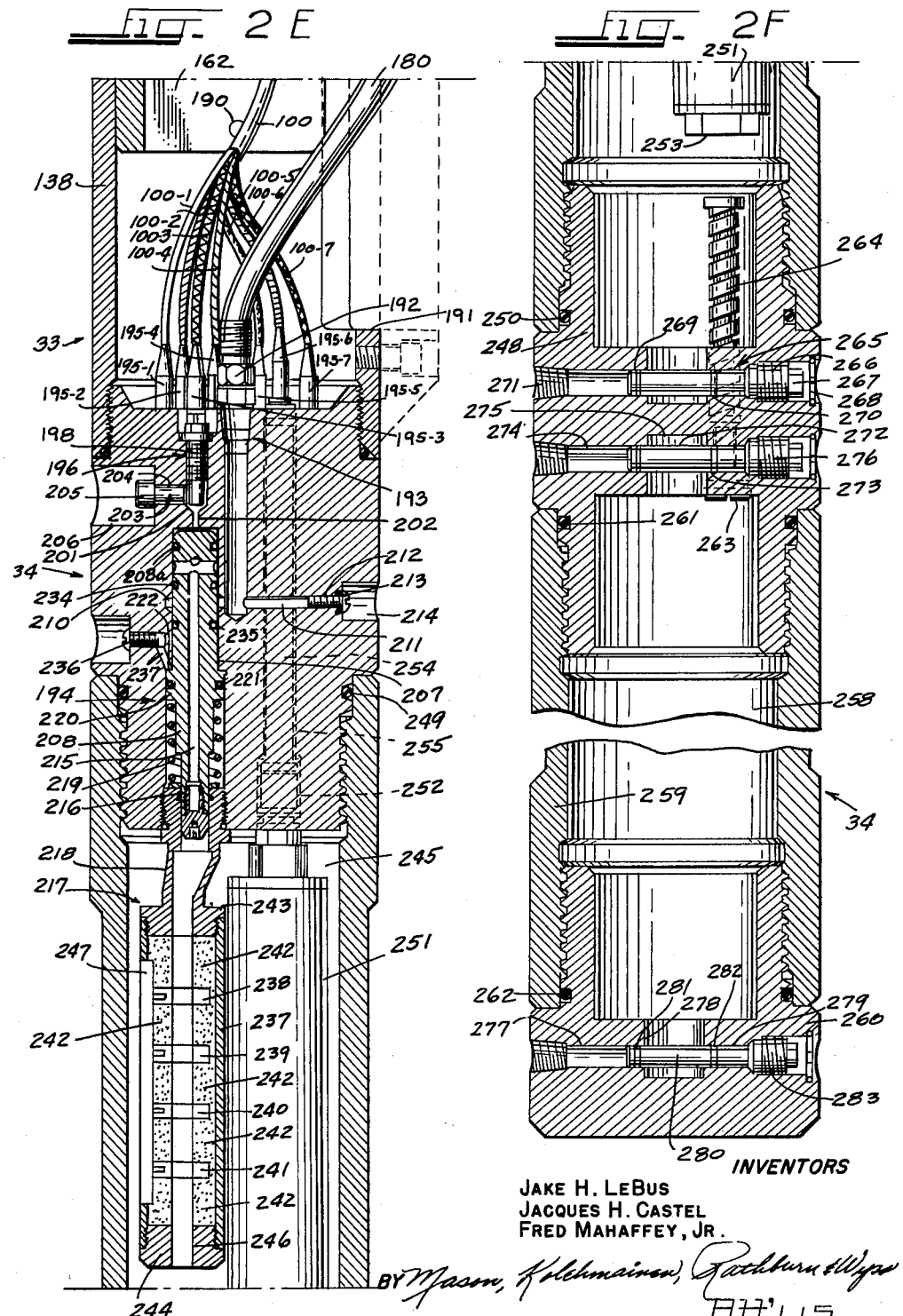

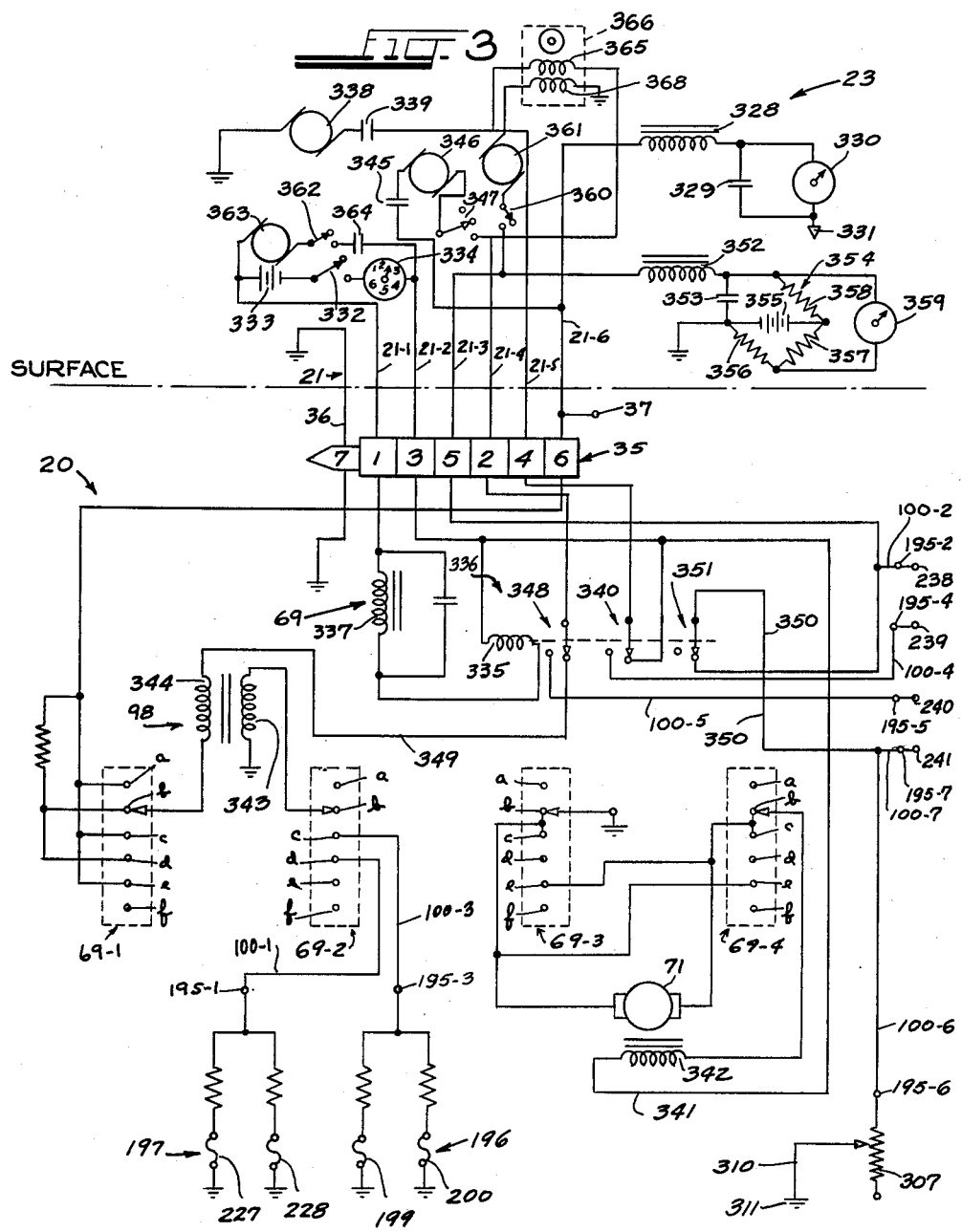

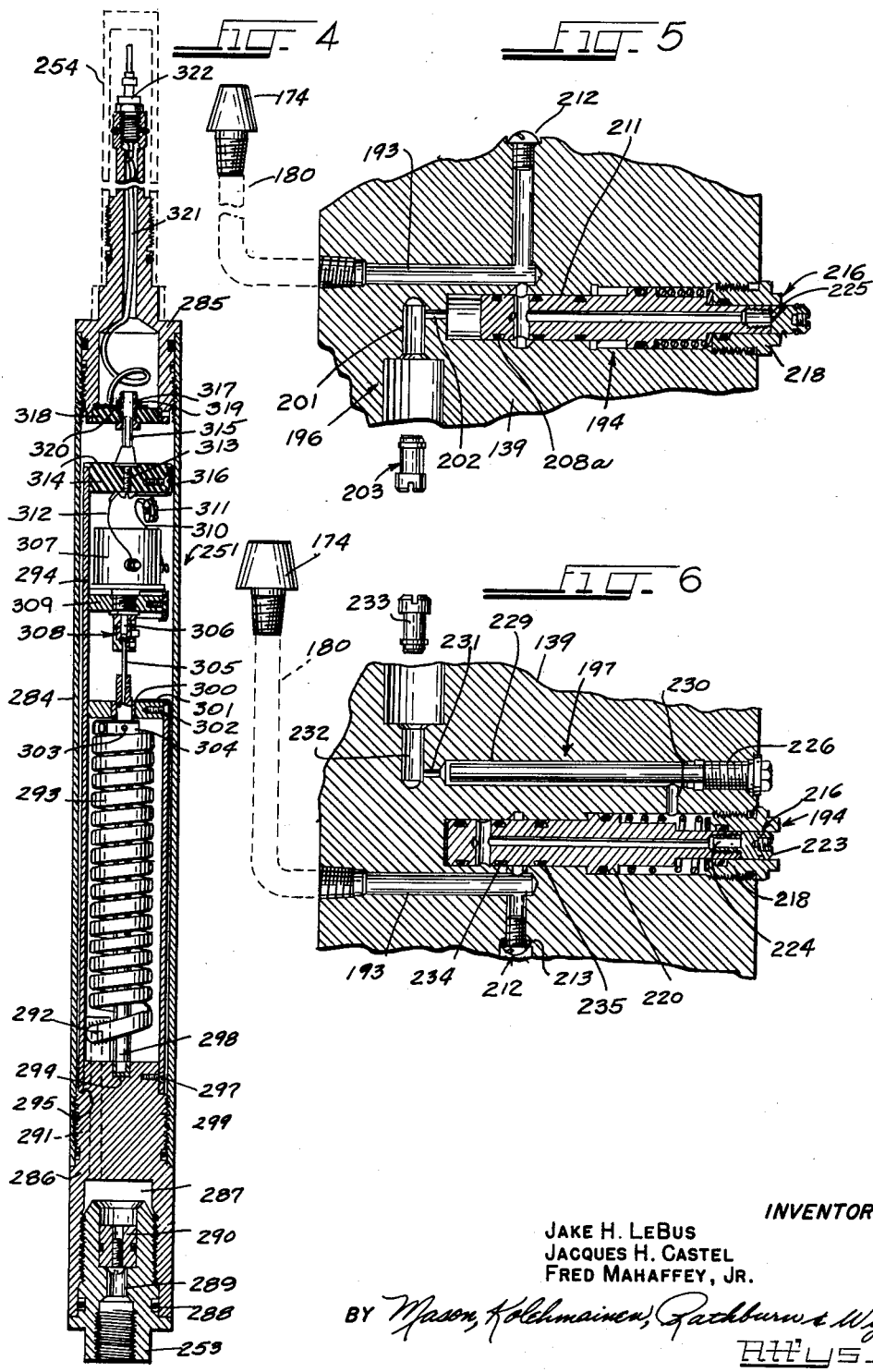

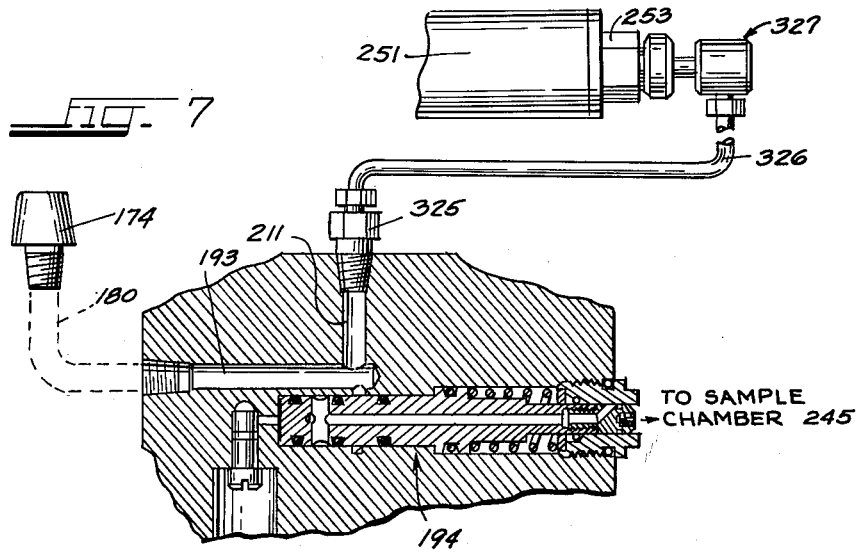
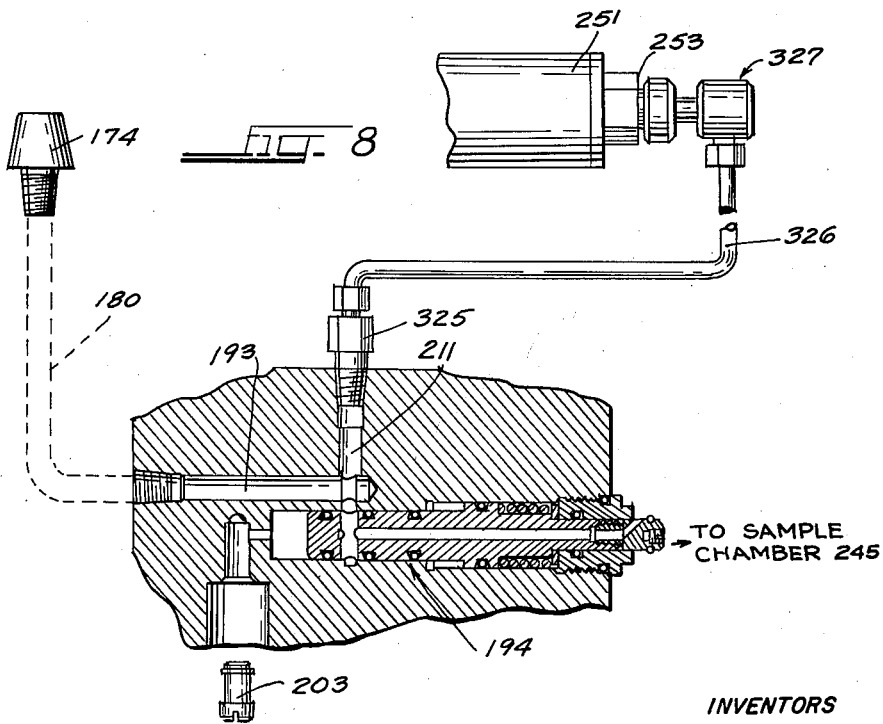

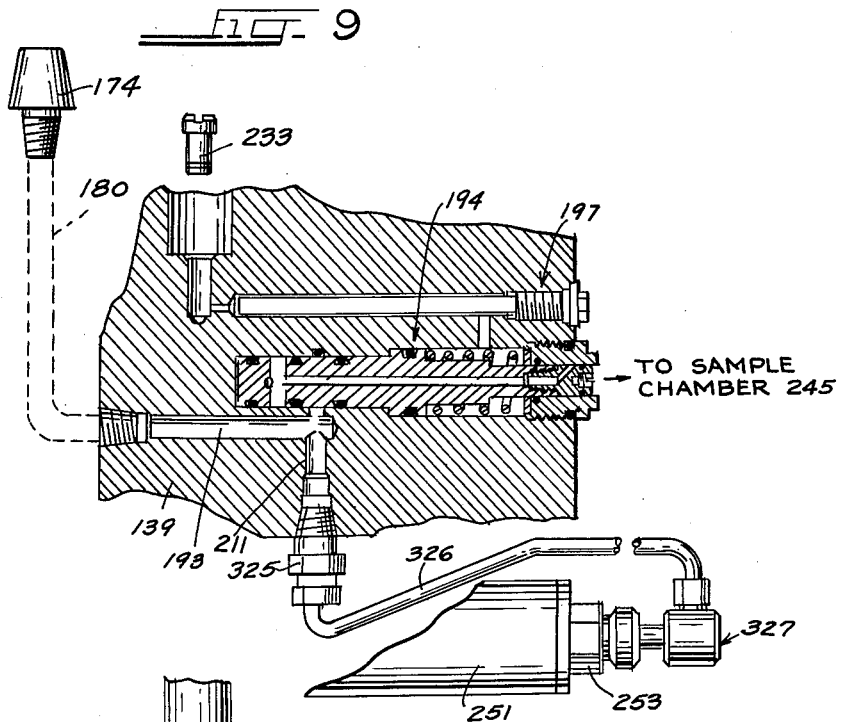
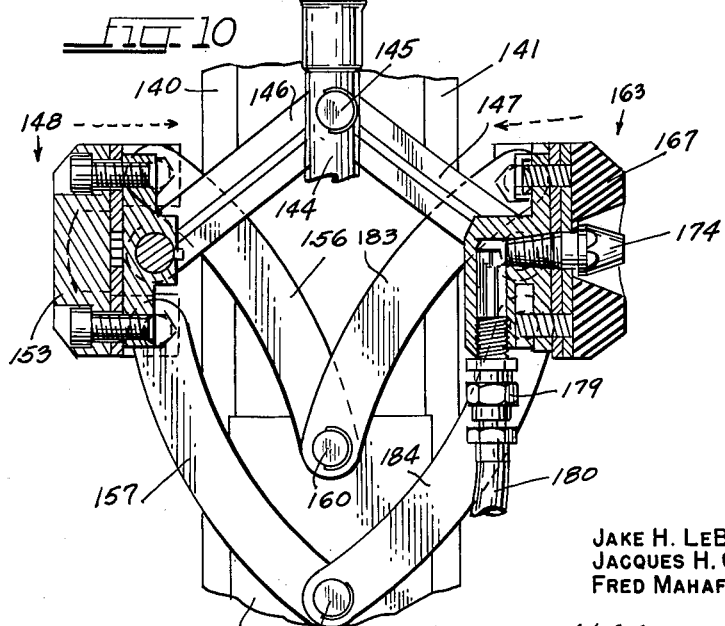

Jake H. Le Bus, Bellaire, and Jacques H. Castel and Fred Mahaffey, Jr., Houston, Tex., assignors, by mesne assignments, to PGAC Development Company, Houston, Tex., a corporation of Texas
Filed Oct. 20, 1958, Ser. No. 768,331
32 Claims. (Cl. 73—152)

This invention relates generally to a sampling apparatus for determining the nature of subterranean formations and is more particularly concerned with new and improved apparatus for extracting fluid samples from formations adjacent a borehole and for analyzing the samples after they have been extracted.

Samples of the fluids present in the formations surrounding a well or borehole yield a large amount of information useful in determining the existence and exact location of structures containing oil, gas or other minerals. In many of the prior art arrangements, such samples are collected by means of a sampling tool lowered into the borehole and are brought to the surface for examination and analysis while in other prior art arrangements, measurements of the characteristics of the fluid sample are made in situ by sending the useful information to the surface. Each of these arrangements possesses certain advantages as well as a number of disadvantages accruing from the type of information to be derived from the sample. Thus, for example, when such qualities as the pressure, resistivity, etc. of the sample are to be measured it is preferable to obtain the information with the downhole tool in position adjacent the formation being tested since these properties can be measured much more accurately when the sample is in its natural environment. Other measurements, such as those derived from qualitative and/or quantitative analysis of the sample, are, of course, possible only by removing the sample from the borehole. Thus, neither of the prior art sampling arrangements discussed above provides entirely satisfactory results since each has its own limitations. It is an object of the present invention to provide a sampling apparatus wherein those measurements which are best made with the sample in its natural environment are obtained by transmitting useful information to the surface with the downhole tool in situ within the borehole while, at the same time, the sample captured may subsequently be withdrawn from the borehole to obtain those particular measurements which are best made by direct operations upon the sample.

One of the most frequent sources of inaccuracy in the information derived from a sample in arrangements employed prior to the present invention arises from the inability to obtain a true sample of the formation fluids to the exclusion of contaminating fluids such as the drilling fluid present in the borehole. These contaminating fluids usually enter the sampling tool and are mixed in indeterminate quantities with the sample fluid so that an accurate determination of the contents of the sample fluid is impossible. In an attempt to overcome this problem, the prior art arrangements usually include a sampling probe or inlet which is adapted to be seated against the wall of the borehole in order to permit the flow of formation fluid to the sampling tool. However, in most of these arrangements, the contaminating fluids enter the sampling inlet with the formation fluid due to the inability to provide an effective seal between the sampling inlet and the walls of the borehole. In other instances the contaminating fluids enter the sampling tool while the tool is being oriented in proper position adjacent the formation being tested since no provision is made for isolating the sample collecting chamber from the inlet while such orientation is being effected. Thus, in these prior art systems the fluid entering the sampling chamber at the beginning of the sample contains an inordinate amount of the drilling fluid while the subsequently collected fluid more truly represents the formation fluids but frequently these fluids are all mixed together so that it is impossible to obtain an accurate sample. An object of the present invention is to obviate these problems by providing a sampling tool which uses as an inlet a punch driven well into the formation being tested where it is isolated from the borehole fluid and is extended to such a depth that it is unlikely to become clogged or sealed by breakdown of any relatively soft formations such as sands or mud filtrate.

A further object of the invention resides in the provision of valve means for isolating the sample collecting chamber from the inlet during the period when the tool is being moved to the desired borehole position.

Another object of the invention is to provide an arrangement according to the preceding object wherein the valve means is selectively operable from the surface so that it is opened only when the punch has been driven into the formation at the desired borehole depth and the valve means remains open until subsequently closed in response to a signal from the surface.

Still another object of the invention is to provide a sampling apparatus according to the preceding object wherein the extension and retraction of the sampling punch into or out of the borehole formations is controlled from the surface without operating the valve means so that the downhole tool can be set and reset until its position is accurately established and thereafter the valve means may be opened to obtain the sample.

A still further object of the invention is to provide a sampling tool wherein the initial portion of the fluid flowing through the sampling inlet or punch is separated from the formation fluids collected near the termination of the sampling operation.

It is also an object of the invention to provide an improved sampling apparatus employing a downhole sampling tool which is compactly arranged but is nevertheless rugged and efficient in operation even at the high temperatures and large hydrostatic pressures encountered in boreholes.

It is likewise an object of the invention to provide a sampling aparatus employing a very small sampling inlet or punch assembly so that precise measurements can be made of the type and amount of fluid recoverable from a specific stratum under investigation, thereby facilitating an accurate determination of the existence and exact location of interfaces between gas bearing, oil bearing and water bearing layers of permeable formations lying adjacent the borehole.

Other advantages of the invention reside in certain details of construction of the sampling tool of the present invention and such details will be pointed out as the description proceeds.

In accordance with the present invention the foregoing and other objects are realized by providing a sampling apparatus including a downhole tool adapted to be raised or lowered within a borehole upon the lower end of a cable connecting the tool to equipment at the surface. The downhole tool includes a reversible electric motor having its output shaft connected to drive a pump for controlling the supply of fluid to a punch operating piston and cylinder assembly. The direction of rotation of the motor shaft is controlled from the surface and when this shaft is driven in one direction the piston and cylinder assembly is rendered effective to force a sampling punch to penetrate the formation being tested while rotation of the shaft in the opposite direction results in withdrawal of the punch. To force the punch against the wall of the borehole and to enable it to penetrate the formation, a back-up mechanism displaced from the punch about 180° around the axis of the tool is extended and retracted into and out of engagement with the borehole wall simultaneously with the extension and retraction of the punch. A first valve controlled from the surface is disposed between the sampling punch inlet and a first sample collecting chamber in the downhole tool. The first valve is normally closed to prevent the fluid from reaching the collecting chamber and may be opened only in response to a signal from the surface after the downhole tool has been accurately positoned at the desired borehole depth exactly opposite the formation to be tested. Since the operation of the first valve is independent of the motor, the punch may be extended and retracted several times as the position of the tool is set and reset until the operator is satisfied with its location in the borehole and only after the punch has been fully extended at the exact depth desired is the first valve opened to begin the sample taking operation. The pressure and resistivity of the fluid sample are measured at the surface as the sample is being collected in order to monitor the operation of the downhole tool and, at the same time, to obtain information concerning the nature of the subsurface formation under investigation. When the first sample chamber has been filled a second valve may be automatically opened to exhaust its contents into a second sample collecting chamber with the flow of sample fluid continuing until the second chamber is filled whereupon the second valve closes automatically to separate the first and second collecting chambers. The flow of sample fluid through the inlet punch continues until the first collecting chamber is filled at which time the first valve is closed from the surface to break the fluid circuit from the inlet. Thus, the fluid in the second collecting chamber containing a mixture of the formation fluids with a very small amount of borehole fluids is isolated from the fluid in the second chamber which consists exclusively of the formation fluids. After both of the sample collecting chambers have been filled and after the first valve has been closed, the motor is operated to retract the punch and the back-up mechanism so that the downhole may be withdrawn from the borehole to permit the collected samples to be examined and analyzed.

The invention both as to its organization and manner of operation together with further objects and advantages will best be understood by reference to the following detailed description taken in conjunction with the accompanying drawings wherein:

FIG. 1 is a partially diagrammatic, partly broken away view illustrating a sample taking apparatus characterized by the features of the present invention and shows the downhole tool in position within a borehole preparatory to the start of a sample taking operation;

FIGS. 2A, 2B, 2C, 2D, 2E and 2F when laid one below the other in the order named are an enlarged view principally in section showing the downhole tool of the apparatus illustrated in FIG. 1;

FIG. 3 is a schematic diagram showing the electrical circuits employed in the operation of the apparatus illustrated in FIG. 1;

FIG. 4 is a sectional view showing a pressure sensitive device employed in the apparatus illustrated in FIG. 1;

FIG. 5 is an enlarged sectional view showing a valve mechanism employed in the apparatus shown in FIG. 1 in its open position;

FIG. 6 is a view similar to FIG. 5 but shows the valve mechanism in the closed position;

FIG. 7 is a view similar to FIG. 5 but shows an alternative connection of the pressure sensitive device in the hydraulic circuit to the valve mechanism with the latter being shown in its closed position;

FIG. 8 is a view similar to FIG. 7 but shows the valve mechanism in its open position;

FIG. 9 is a view similar to FIG. 7 and illustrates particularly the arrangement employed to return the valve mechanism from its open position to its closed position; and FIG. 10 is a fragmentary view principally in section showing the sampling punch and back-up assemblies of the present invention in their retracted positions.

Figure 2D:
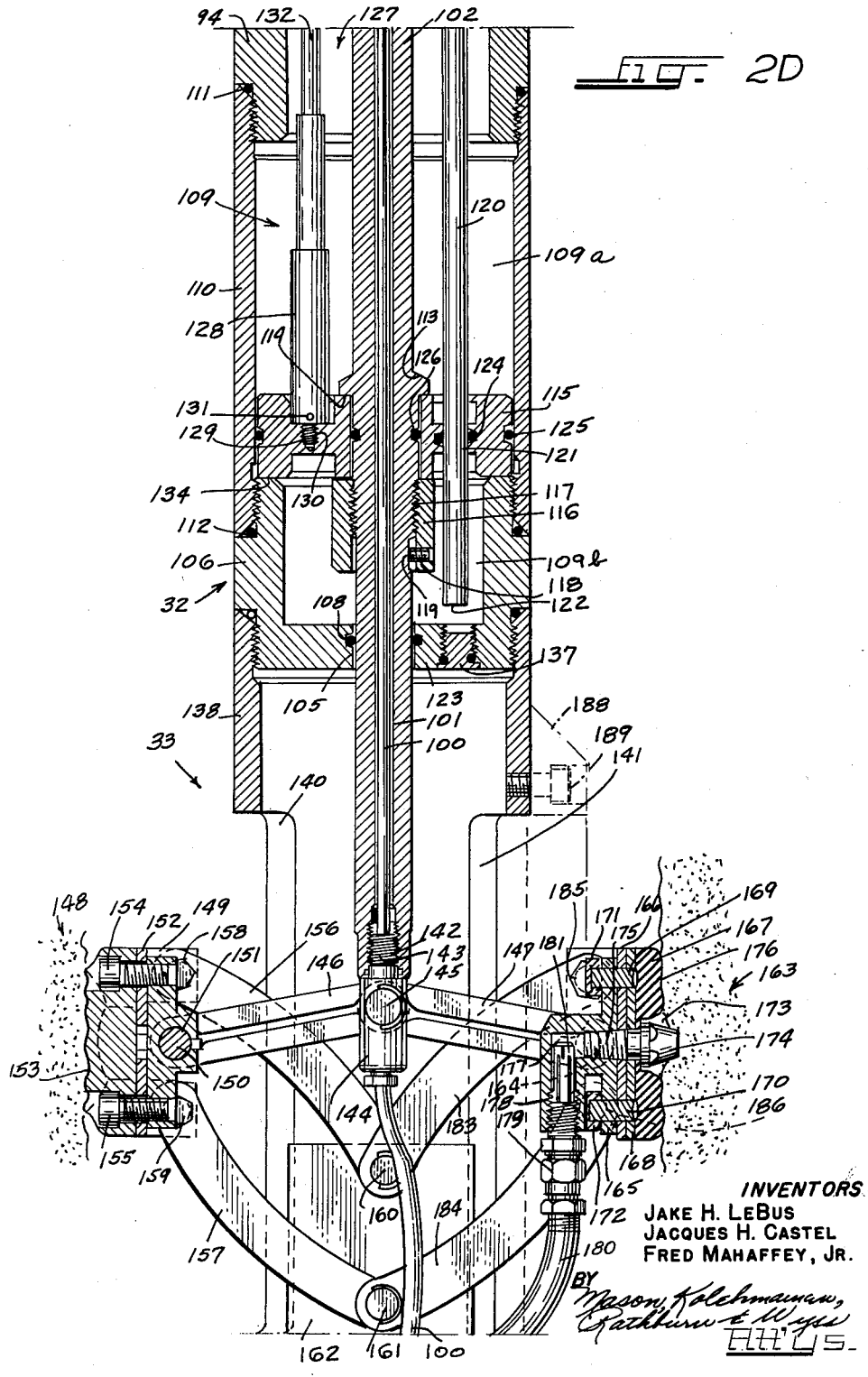

Referring now to the drawings and more particularly to FIG.1 thereof, the sampling apparatus of the present invention is there illustrated as comprising a downhole tool 20 attached to the lower end of a multiple conductor cable 21 extending through a borehole 22 to surface equipment indicated generally by the reference numeral 23. A hoisting mechanism including a power driven sheave 24 is provided at the surface for reeling in or paying out the cable 21 in order to raise or lower the downhole tool 20 within the borehole. Although not shown in the drawings, the borehole 22 may be at least partially filled with drilling fluid of the type conventionally employed in drilling operations. The borehole 22 traverses or penetrates the subterranean structure comprising a plurality of vertically displaced strata including at least one layer 25 whose characteristics are being investigated.

The surface equipment 23 includes a recording apparatus 26 for developing upon a recording medium 27 signals or traces indicative of the characteristics of any fluids extracted from the layer 25 by the downhole tool 20 in a manner described more fully below. The recording apparatus 26 may be of any type well known in this art and may, for example, include a set of galvanometers for controlling the deflection of light beams focused upon a light sensitive recording medium 27. The recording medium 27 is preferably moved past the light beams by a drive mechanism indicated by the broken line 28 and driven in synchronism with the hoisting mechanism for the cable so that the signals appearing upon the recording medium are correlated with the depth of the downhole tool 20 within the borehole 22. Suitable mechanism (not shown) may be employed for impressing appropriate indicia upon the medium 27 to indicate the various borehole depths transversed by the tool 20.

The component elements of the downhole tool 20 are enclosed within an outer shell or housing 29, which, as is best shown in FIGS. 2A to 2F, inclusive, is made in sections in order to facilitate the assembly of the various parts therein, the individual sections being suitably secured in end-to-end relationship as by threading them together. To facilitate the ensuing description, the downhole tool 20 may best be considered as including a wire line cable head assembly indicated generally by the reference numeral 30 in FIG. 2A, a switching and pumping unit indicated generally by the reference numeral 31 in FIGS. 2B and 2C, a hydraulic piston section indicated generally by the reference numeral 32 in FIGS. 2C and 2D, a sampling punch and back-up section indicated generally by the reference numeral 33 in FIGS. 2D and 2E and a sample analyzing and storing section indicated at 34 in FIGS. 2E and 2F. The uppermost section 30 includes a quick change connector 35 of conventional construction secured to the lower end of an outer lead sheath 36 enclosing the conductors of the cable 21. A reference electrode 37 is embedded in the latter sheath at a point spaced above the connector 35 for the purpose of collecting self potential or natural earth signals for transmission to the surface equipment, as is described more fully hereinafter, in order to facilitate the orientation of the downhole tool 20 at the proper borehole depth to begin the sample taking operation.

The lower end of the quick change connector 35 is secured to a fishing bell fitting 38 and the remaining sections of the downhole tool 20 are detachably secured to the lower end of the latter fitting. The remaining sections of the downhole tool may be replaced by a conventional fishing tool in the event that one or more of these sections drops into the borehole so that it becomes necessary to fish for the lost sections in order to retrieve them.

In the form of the invention illustrated in the drawings, a cable 21 is illustrated employing six conductors extending enclosed within the outer sheath 36 although it should be understood that modification of the electrical circuits described hereinafter will permit the use of a cable employing a different number of conductors. The individual conductors of the cable 21 are identified by the reference numerals 21–1, 21–2, 21–3, etc. and these conductors extend through the quick change connection 35 and through the interior of the fitting 38 to a terminal plug 39 secured to the lower end of the fitting. An additional conductor is connected to the sheath 36 and extends through the uppermost section 30 so that seven conductors respectively pass through parallel conductor passages 39–1, 39–2, 39–3, etc. formed in the plug 39. It will be understood, therefore, that seven such passages are provided although only three are visible in FIG. 2A of the drawings. The plug 39 includes a main body portion 39a having substantially the same diameter as the outer diameter of the fitting 38 together with an externally threaded reduced diameter portion 40 for receiving a quick change connector nut 41 which functions to connect the tool section 30 with the switching and pumping unit 31. To this end, the quick change connector nut 41 is threaded onto the neck 42 of a slip ring housing 43.

For the purpose of accommodating female sockets 44–1, 44–2, 44–3, etc. which receive banana plugs 45–1, 45–2, 45–3, etc. respectively attached to the lower ends of conductors 21–1, 21–2, 21–3, etc., a plurality of enlarged recesses 42–1, 42–2, 42–3, etc. are formed in the neck 42 in alignment with corresponding recesses 40–1, 40–2, 40–3, etc. formed in the reduced diameter portion 40 of the terminal plug 39. The banana plugs and female sockets, of course, provide electrical connections between the wire line cable head assembly 30 and the switching and pumping unit 31. A sealing gasket or ring 46 is interposed between the neck 42 and the reduced diameter portion 40 for the purpose of providing a fluid seal to prevent the entry of borehole fluid. The female sockets 44–1, 44–2, 44–3, etc. are connected to electrical terminals 47–1, 47–2, 47–3, etc. which are, in turn, connected through suitable conductors (not shown) to a slip ring assembly indicated generally by the reference numeral 48. The latter assembly is housed within a hollow chamber 49 formed in the slip ring housing 43 and provides an electrical connection from the terminals 47–1, 47–2, 47–3, etc. to conductors 50–1, 50–2, 50–3, etc. extending into the switching and pumping unit 31.

The components of the switching and pumping unit 31 are enclosed within a cylindrical casing 51 having its upper end threaded onto a reduced diameter portion 52 of the slip ring housing 43 and having its lower end threadedly secured to a lower end fitting 53. O-rings or gaskets 54 and 55 are employed at each end of the cylindrical casing 51 in order to provide fluid seals for the threaded connections. The lower end fitting 53 includes an enlarged head portion 56 having an outer diameter corresponding to that of the casing 31 together with externally threaded reduced diameter portions 57 and 58. An annular recess 59 at the upper end of the reduced diameter portion 57 forms a central hub 57a. A plurality of conductor passages 60, only one of which is visible in FIG. 2C extend longitudinally through the fitting 53 for the purpose of accommodating electrical conductors connecting the switching and pumping unit 31 to the lower sections of the downhole tool 20. The conductors extending through the passages 60 are connected to electrical terminals 61–1, 61–2, 61–3, etc. carried on the bottom or underside of the reduced diameter portion 58. A pair of elongated support posts 62 and 63 of arcuate cross section have their lower ends seated within the recess 59 and are secured at their upper ends to a plate 64 which supports the slip ring assembly 48. The posts 62 and 63 are secured to the lower end fitting 53 in any suitable manner as, for example, by machine screws passing through each of the posts and into engagement with tapped openings formed in the central hub 57a. One of the machine screws for securing the post 62 to the hub 57a is indicated by the reference numeral 65 while a similar machine screw for securing the post 63 to the central hub is identified by the reference numeral 66.

For the purpose of supporting a remotely controlled fixed position stepping switch 69 of conventional construction, a switch support plate 67 is secured to the posts 62 and 63 in any suitable manner as, for example, by means of machine screws 68. The switch 69 includes a plurality of switch sections 69–1, 69–2, 69–3 and 69–4 which are connected to the conductors 50–1, 50–2, 50–3, etc. in the manner shown in FIG. 3 and described more fully hereinafter. Disposed immediately below the stepping switch 69 is a four terminal connector 70 for supplying signals from the surface to control the operation of a reversible electric motor 71. The four terminal connector 70 is secured to the support posts 62 and 63 and is electrically connected to the conductors leading from the slip ring assembly 48 in a manner which is again illustrated in FIG. 3. The output terminals of the connector 70 are connected through conductors 72 to the motor 71 which is secured to motor support blocks 73 and 74 respectively attached to the posts 62 and 63. The motor 71 is adapted to drive its output shaft 75 in a direction dependent upon signals received from the surface equipment and supplied to the four terminal connector 70. The output shaft 75 is connected through a universal joint 76 to drive the input shaft of a speed reducer or reduction gearing 77 which, in turn, has its output shaft 78 connected to drive a positive displacement gear type pump 79 of conventional construction. The gear reduction unit 77 is suitably secured in fixed position to the support posts 62 and 63, as, for example, by means of machine screws 80.

A set of terminal connections 97 is secured to the support post 62 for the purpose of providing electrical connections to a firing transformer 98 and to other components of the downhole tool in the manner illustrated in FIG. 3 and described more fully below. The pump 79 includes a mounting flange 81 bolted or otherwise secured to the support post 62 in such position that the input shaft 82 for the pump may be secured directly to the output shaft 78 of the reduction gearing. The pump body is also provided with a pair of fittings forming the ports for the pump but only one of these fittings is visible in FIG. 2C and this is designated by the reference numeral 83. However, the flexible conduits leading to the two fittings are both shown and these conduits are identified by the reference characters 84 and 85. The lower ends of the conduits 84 and 85 are respectively secured to suitable fluid connectors 86 and 87 secured upon the upper face of the central hub 57a. Suitable fluid conveying passages (not shown) extend through the lower end fitting 53 from the fluid connectors 86 and 87 to a second pair of fluid connectors 88 and 89 mounted upon the bottom of the reduced diameter portion 58. The connectors 88 and 89 are, in turn, secured to the upper ends of a pair of pipes 90 and 91 having their lower ends respectively attached to fluid couplings 92 and 93 mounted upon an end fitting 94. A cylindrical sleeve 95 is connected between the two fittings 53 and 94 and is provided with an open window indicated at 96 for the purpose of providing access to the electrical terminals 61–1, 61–2, 61–3, etc. and to the fluid connections 88, 89, 92 and 93.

The terminals 61–1, 61–2, 61–3, etc. are respectively connected to conductors 100–1, 100–2, 100–3 etc. of a cable 100 which extends within the sleeve 95 and then continues through an elongated axial passage 101 formed in a piston rod 102 in the hydraulic piston section 32 of the tool. The upper end of the piston rod 102 is accommodated within a central opening 104 formed in the fitting 94 while the lower end extends through a central opening 105 in an end fitting 106 which is similar in construction to the fitting 94 referred to above. Gaskets or rings 107 and 108 are seated within annular grooves respectively formed in the fittings 94 and 106 and bear against the outer surface of the piston rod to seal the ends of a piston chamber indicated generally by the reference numeral 109. The latter chamber is defined by a cylindrical casing 110 threaded at its upper end onto the fitting 94 and threaded at its lower end onto the fitting 106. Here again, suitable sealing gaskets 111 and 112 are provided to isolate the chamber 109 from the borehole fluid. A removable filler plug 137 is provided on the fitting 106 for the purpose of filling the chamber 109 with hydraulic fluid prior to insertion of the tool within the borehole. An annular flange 113 formed on the piston rod 102 intermediate its end defines a shoulder 114 against which is seated a hydraulic piston 115 movable within the chamber 109. The piston is retained against the shoulder 114 by means of an adjustable nut 116 threaded onto an externally threaded portion 117 of the piston rod 102 and this nut is retained in position by means of a set screw 118 having its inner end seated within a notch 119 formed in the periphery of the piston rod. A gasket or ring 125 is seated within an annular groove defined in the outer periphery of the piston and bears against the inner wall of the casing 110 so that the piston effectively divides the chamber 109 into an upper chamber portion 109a and a lower chamber portion 109b.

An elongated pipe 120 having its upper end threaded into the fitting 94 in communication with the pipe 91 and the hydraulic coupling 93 extends downwardly through the chamber 109 and through a passage 121 in the piston 115 and has its open lower end 112 spaced slightly above the upper surface of a central web 123 on the fitting 106. The chamber 109 both above and below the piston 115 is filled with hydraulic fluid such as oil and the piston 115 carries an O-ring 124 in engagement with the pipe 121 to prevent the flow of fluid between the portions 109a and 109b along the pipe. An O-ring 126 seated within an annular groove defined in the piston rod 102 engages the inner wall of the piston to prevent the flow of fluid between the upper and lower chamber portions 109a and 109b. A telescoping pipe assembly indicated at 127 provides a fluid connection between the upper chamber portion 109a and the hydraulic coupling 92. To this end, the lowermost pipe section 128 of the assembly 127 is secured for movement with the piston 115 by means of an externally threaded, downwardly depending post or stud 129 inserted into a tapped bore 130 formed in the piston. The pipe section 128 includes an aperture 131 formed near its lower end for the purpose of admitting the fluid in the upper chamber portion 109a to the interior of the telescoping pipe assembly 127. The uppermost pipe section 132 of the telescoping assembly 127 is threaded into a tapped bore 133 defined in the end fitting 94 in alignment with the pipe 90 and the hydraulic coupling 92.

In view of the foregoing description, it will be recognized that movement of the piston 115 within the chamber 109 is accomplished by transfer of fluid between the spaces 109a and 109b formed on the opposite sides of the piston. The described transfer is effected by the pump 79 under the control of the reversible motor 71 and the direction of fluid flow is, of course, a function of the direction of drive of the pump. More specifically, when it is desired to raise the piston 115 within the chamber 109 for the purpose of retracting the back-up and punch assemblies in a manner described more fully below, the pump 79 is driven in the proper direction to draw fluid through the opening 131 through the telescoping pipe section 127, through coupling 92, through pipe 90, through a fitting 88, through fitting 86 and through a flexible conduit 84 and to deliver pressurized fluid through the conduit 85, through the fitting 87, through the fitting 89, through the pipe 91, through the coupling 93 and through the elongated pipe 120 to the space 109b. Introduction of fluid under pressure to the lower side of the piston 115, of course, raises the piston within the chamber 109 and moves the piston rod 102 upwardly as viewed in FIG. 2D. When it is desired to lower the piston 115 within the chamber 109, the direction of rotation of the motor 71 is reversed so that the pump draws fluid from the lower chamber portion 109b through the pipe 120 and delivers fluid under pressure through the telescoping pipe assembly 127 to the upper chamber portion 109a. Downward movement of the piston 115 is limited by engagement with the upper end 134 of the fitting 106. The described fluid circuit forms a closed system which eliminates the necessity for a separate reservoir or tank due to the fact that the two spaces 109a and 109b serve as their own reservoirs. Since the tool is always used in an upright position as shown in the drawings, a continuous supply of hydraulic fluid is retained below the piston 115 and within the hollow portion of the fitting 106. It will also be observed that the hydrostatic pressure of the borehole fluid acts against the opposite ends of the piston rod 102 at the sealing gaskets 107 and 108 so that a pressure balance is created which permits operation of the tool in very deep boreholes having relatively large hydrostatic pressures. Due to the described balance, the system is relatively free from losses since the only direct loss results from the drag created by the well lubricated sealing rings 107 and 108 and the rings 124 and 125.

The lower end of the piston rod 102 extends downwardly within a cylindrical sleeve 138 threaded at its upper end onto the fitting 106 and threaded at its lower end onto a valve body or fitting 139. The sleeve 138 is provided with a pair of diametrically opposed elongated slots 140 and 141, the purpose of which will become evident as the description proceeds.

For the purpose of receiving an externally threaded fitting 143 formed on a central support hub 144, the extreme lower end of the piston rod 102 is provided with a tapped axial bore 142 in alignment with the elongated cable carrying passage 101. The support hub 144 includes an axial passage therethrough for the cable 100 which extends downwardly to the sample analyzing and storing section 34 described more fully below. A pair of diametrically opposed lugs 145, only one of which is visible in FIG. 2D, are formed on the hub 144 to support a pair of thrust linkages 146 and 147 extending radially outwardly from the hub through the guide slots 140 and 141, respectively. The outer end of the thrust linkage 146 is pivotally secured to a back-up assembly 148 which includes a support block 149 having a hinge pin 150 thereon extending through a pin receiving opening 151 in the end of the thrust linkage. A spacing shoe 152 and a resilient back-up pad 153 are secured to the block 149 in any suitable manner as, for example, by means of machine screws 154 and 155 passing through aligned openings in these members and into threaded engagement with tapped bores formed in the block. A pantograph linkage including link arms 156 and 157 is employed to maintain the outer face of the resilient back-up pad 153 parallel to the axis of the tool 20 when the backup assembly is extended or retracted. To this end, the outer ends of the link arms 156 and 157 are respectively secured for pivotal movement upon hinge pins 158 and 159 formed on the support block 149 while the inner ends of these link arms are respectively mounted for pivotal movement upon hinge pins 160 and 161 carried upon a sliding block 162 having its opposed edges seated for sliding movement within the elongated guide slots 140 and 141.

The outer end of the thrust linkage 147 is pivotally secured to a sampling punch assembly indicated generally by the reference numeral 163. To this end, the thrust linkage 147 includes a pin receiving opening accommodating a pivot pin 164 mounted upon a support block 165 forming a part of the assembly 163. A spacer block 166 is interposed between the block 165 and a resilient sealing pad 167 molded upon a shoe 168 and these elements are secured together by means of threaded studs 169 and 170 threadedly engaging nuts 171 and 172. The resilient sealing pad 167, which is preferably formed of rubber or the like, is provided with a recess 173 and a central opening for accommodating a hollow sampling punch 174 having an externally threaded inner sleeve portion which passes through aligned openings in the shoe 168 and in the spacer block 166 and is received within a tapped central bore in the block 165. When the sampling punch assembly 163 is in the retracted position shown in FIG. 10, the extreme outer end of the punch 174 is approximately aligned with the flat outer face 176 of the resilient sealing pad 167 but, when these elements are urged against the walls of the borehole by extending the assembly 163, the sealing pad is compressed while the end of the punch continues into the formation under investigation as is clearly shown in FIG. 2D. The tapped bore 175 opens to an L-shaped passage 177 in the block 165 and this passage, in turn, is internally threaded as indicated at 178 for the purpose of receiving a fluid coupling 179 mounted upon a flexible hose 180. A perforated cylindrical filtering screen 181 is disposed within the passage 177 for the purpose of removing debris or foreign particles contained in the fluid entering the sampling punch 174.

To maintain the assembly 163 parallel to the axis of the tool 20, the block 165 carries a pair of hinge pins 185 and 186 each supporting one end of a pantograph arm, the two pantograph arms being designated as 183 and 184 and having their other ends pivotally secured to the sliding block 162. In view of the foregoing description, it will be recognized that operation of the motor 71 and the pump 79 to move the piston 115 downwardly results in downward movement of the piston rod 102 to pivot both of the thrust linkages 146 and 147 about their respective mounting pins in order to move the back-up assembly 148 and the punch assembly 163 from their retracted positions shown in FIG. 10 to their extended positions shown in FIG. 2D. More specifically, downward movement of the piston rod 102 pivots the pantograph arms 156 and 157 about the pins 160 and 161 in a counterclockwise direction as viewed in FIG. 2D while, at the same time, the pantograph arms 183 and 184 pivot in a clockwise direction. The described movement of the pantograph arms maintains the assemblies 148a and 163 substantially parallel to the axis of the tool 20 during their extension until the back-up pad 153 engages the borehole wall and, at the same time, the outer surface 176 of the sealing pad 167 engages a point on the borehole walls which is diametrically opposed to the point of engagement of the pad 153. Since the back-up assembly 148 is mounted in the same plane as the assembly 163, that is, in a plane extending normal to the axis of the tool 20, it exerts a force through the described linkage acting upon the assembly 163. Continued downward movement of the rod 102 compresses the pad 153 slightly and forces the punch 174 to penetrate the formation 25 while, at the same time, compressing the pad 167 to form a fluid tight seal for excluding the fluid in the borehole from the inlet for the punch 174. Any fluid in the formation 25, of course, enters the hollow punch 174, passes through the screen 181 and flows through the passageway 178 and through the coupling 179 to the flexible hose 180. In order to retract the assemblies 148 and 163, the motor 71 and the pump 79 are operated to raise the piston 115 and the piston rod 102 whereupon the punch 174 is withdrawn from the borehole formations and the sealing pads 153 and 167 are moved out of engagement with the borehole walls. This movement is accomplished by pivoting the pantograph arms 156 and 157 in a clockwise direction as viewed in FIG. 2D while the pantograph arms 183 and 184 are pivoted in a counterclockwise direction until the assemblies 148 and 163 reach the retracted position shown in FIG. 10. During shipment or storage of the tool 30, the end of the punch 174 may be protected by covering the slot 141 with a suitable cover plate indicated by the broken lines in FIGS. 2D and 2E and identified by the reference numeral 188. This cover plate may be secured to the cylindrical casing 138 by means of machine screws 189.

Provision is also made for retracting the assemblies 148 and 163 in the event of failure of the hydraulic system described above in order to permit the tool 20 to be withdrawn from the borehole despite the system failure. To this end, one or more shear pins 190 are inserted within openings respectively defined in the slide block 162 and in the cylindrical casing 138. These pins have sufficient strength to be maintained intact during normal operation of the tool 20 but, in the event of failure of the hydraulic system, they may be sheared by applying a hoisting pull to the cable 21 from the surface. More specifically, when the assemblies 148 and 163 are extended they are wedged against the walls of the borehole and, hence, resist any upward movement of the tool 20 with the result that a hoisting pull applied to the cable 21 tends to pivot the pantograph arms 156, 157, 183 and 184 in a direction to force the assemblies 148 and 163 outwardly. The force is, of course, applied through the body of the tool and, more specifically, through the casing 138 and through the sliding block 162 to the shear pins 190 and when it reaches a predetermined amount, the pins 190 will shear, thus permitting the sliding block to fall downwardly within the cylindrical casing 138 by gravity. Downward movement of the block 162 is limited by engagement with the lower edge 191 of the guide slot 141. The described downward movement of the block 162, of course, pivots the pantographs arms 156 and 157 in a clockwise direction as viewed in FIG. 2D and pivots the arms 183 and 184 in a counterclockwise direction so that both of the assemblies 148 and 163 are moved to their retracted positions whereupon the tool 20 may be hoisted to the surface where the necessary repairs to the hydraulic system may be made and the shear pins 190 may be replaced with new pins.

In using the tool 20, it is necessary to make certain that sufficient force is applied through the back-up assembly 148 to force the sampling punch 174 to penetrate the borehole formations and, in order to compensate for the different diameters of boreholes encountered, it may be desirable to replace the shoe 152 on the back-up assembly 148 and to replace the spacer block 166 on the punch assembly 163 with corresponding members of different thickness, the thickness being selected as required to meet the borehole conditions. Any such replacement is, of course, effected at the surface prior to insertion of the tool 20 within the borehole and the size of members to be used is determined by reference to a borehole caliper curve previously obtained by following any of the procedures well known in this art.

The lower end of the flexible hose 180 is connected to a choke or restricted orifice fitting 192 threaded into a central opening in the valve body 139 for the purpose of delivering fluid through a longitudinally extending fluid passage 193 to a main control valve indicated generally by the reference character 194. The valve body 139 also carries a plurality of terminals 195–1, 195–2, 195–3, 195–4, 195–5, 195–6 and 195–7 respectively connected to the lower ends of the cable conductors 100–1, 100–2, 100–3, 100–4, 100–5, 100–6 and 100–7. The valve 194 is opened or closed by signals from the surface equipment and functions in a manner described more fully below to control the flow of fluid from the sampling punch inlet 174 to the sample analyzing and storing section 34 of the downhole tool. More particularly, as is clearly shown in FIG. 2E, the terminal 195–3 is electrically connected to an igniter mechanism 196 which, when energized, functions to open the valve 194 to permit the flow of fluid from the sampling punch inlet to the tool section 34, while the terminal 195-1 is electrically connected to a similar igniter 197 shown in FIG. 6 for closing the valve 194 to block the flow of fluid between the sampling punch inlet and the tool section 34. The igniter 196 includes a plug 198 carrying a pair of fuses 199 and 200 (FIG. 3) electrically connected to a powder cavity 201, the lower end of which communicates with the upper end of the valve 194 through a small passage 202. A releasing plug 203 is inserted into a transverse opening 204 in the valve body 139 and has its inner end communicating with the powder cavity 201 while its head 205 seats within a recess 206 opening to the exterior of the tool 20. The cavity 201 contains a charge of powder so that when an electric circuit is completed to the fuses 199 and 200, the powder is ignited to drive the releasing plug 203 radially outward, thus connecting the passage 202 with the relatively high pressure fluid in the borehole. Fluid under pressure thus flows through the passage 202 to a valve cylinder 207 formed in the valve body 139 and results in downward movement of a valve piston 208 as viewed in FIG. 2E until a sampling inlet 209 formed in the piston is exposed or opened to an annular groove 210 surrounding the valve cylinder and communicating with the longitudinally extending passage 193. The passage 193 is also connected to a radially extending discharge passage 211 which in the embodiment of the invention now being described is closed by a removable screw plug 212 cooperating with an O-ring 213. The head of the removable plug is exposed to the exterior of the tool through a recess 214 so that this plug may be removed and a connection may be made to a fluid analyzing equipment in a manner described more fully hereinafter in connection with the embodiment of the invention shown in FIGS. 7, 8 and 9. In the form of the invention shown in FIGS. 5 and 6, however, the outlet passage 211 is sealed so that the fluid from the sampling punch inlet is delivered to the annular groove 210 and, in the open position of the valve, passes through the sampling inlet passage 209 and through an elongated axial passage 215 formed in the valve piston 208 and through a check valve 216 mounted on the lower end of the valve piston to an electrode holding device 217 for making a resistivity measurement. The device 217 includes an electrode holder having an upwardly extending neck portion 218 threaded or otherwise secured to the lower end of the valve cylinder 207. A biasing spring 219 interposed between the neck portion 218 and an annular flange 220 formed on the valve piston 208 normally urges the valve piston toward its closed position, but the pressure of the borehole fluid entering the upper end of the cylinder 207 through the passage 202 when the igniter 196 is fired is sufficient to overcome the spring and to move the valve piston to the open position shown in FIG. 5. The flange 220 is provided with an annular groove containing a piston ring 221 seating against the walls of the valve cylinder 207. An annular shoulder 222 in the valve cylinder engages the annular flange 220 to limit the upward or closing movement of the valve piston 208.

As is best shown in FIGS. 5 and 6, the check valve 216 includes a cap 223 threaded into the end of the piston 208 and having an axial bore 224 extending partly therethrough in alignment with the elongated axial passage 215. The bore 224 communicates with an inclined passage 225 which, when the valve 194 is in closed position, is blocked or closed by the neck portion 218. When the valve 194 is opened, however, the inclined passage 225 is uncovered to permit the flow of fluid from the passage 215 to the interior of the neck portion 218 and to the electrode holding device 217. A sealing ring 208a carried by the valve piston 208 prevents the borehole fluid entering the passage 202 from reaching the flow of sampling fluid even when the valve is in the open position and, as a consequence, as long as the valve 194 remains open, the fluid flowing to the sample analyzing and storing section 34 consists exclusively of the fluid entering the hollow punch 174.

After the sample has been collected, the operator may complete the circuit to the igniter 197 to close the valve. This igniter, as is best shown in FIG. 6, is similar to the igniter 196 described above in that it includes an igniter plug 226 containing a pair of igniter fuses 227 and 228 shown in FIG. 3 for igniting a charge of powder contained within a powder receiving cavity 229. The cavity 229 is connected through a passage 230 to the valve cylinder 207 at a point located below the flange 220 and is also connected through a restricted opening 231 to a plug receiving chamber 232 accommodating a releasing plug 233. When the powder in the cavity 229 is ignited, the plug 233 is propelled radially outwardly of the tool and borehole fluid is admitted through the opening 231 and through the passage 230 to the valve cylinder 207 and this fluid cooperates with the spring 219 to move the valve piston 208 to its closed position.

When the valve piston 208 reaches the closed position shown in FIG. 6, a pair of O-rings 234 and 235 isolate the annular groove 210 from the sample inlet passage 209, thus blocking the flow of fluid through the valve 194. The rings 234 and 221 prevent fluid from becoming trapped behind the annular flange 220 but in the event of leakage around these rings, the space behind the flange can be exhausted by withdrawing the tool 20 from the borehole and by removing a plug 236 and draining off the fluid through a passage 237.

The electrode holding device 217 receiving the fluid passed by the valve 194 comprises a tube 237 containing a plurality of vertically spaced electrodes or rings 238, 239, 240 and 241. These rings are held in spaced apart relationship within the tube by means of insulating layers indicated by the reference numeral 242. The tube 237 is secured at its upper end to a cap 243 formed integral with the neck portion 218 and at its lower end is threaded onto a lower cap 244. The sampling fluid passes through aligned fluid passages formed in each of the insulating layers 242 and in the rings or electrodes 238, 239, 240 and 241 and this fluid emerges into an upper sampling chamber 245 through a central passage 246 formed in the lower cap 244. The tube 237 is provided with an elongated opening 247 through which electrical connections are made to the spaced apart electrodes. To this end, the terminals 195-2, 195-4, 195-5 and 195-7 are electrically connected respectively to the electrodes 238, 239, 240 and 241 by means of conductors which pass downwardly through spaced conductor carrying passages (not shown) formed in the valve body 139. The conductors connecting the described terminals with the electrodes are not shown in the drawings but it will be understood that they emerge from the lower end of the body 139 and pass through the chamber 245 and through the elongated opening 247 to connect to their associated electrodes. Current from the surface equipment flows between the top electrode 238 and the lowermost electrode 241 through the sample fluid passing through the device 217. Electrodes 239 and 240 may be termed measuring rings or electrodes since the difference of potential existing between these electrodes as a result of the current flow is measured in a manner described below in order to determine the resistivity of the sample fluid.

The fluid flowing from the lower end of the device 217 fills the upper sample collecting chamber 245 which is defined by a sleeve connected at its upper end to the valve body 139 and connected at its lower end to a fitting 248. Here again, sealing gaskets or rings 249 and 250 are employed to isolate the sampling chamber from the borehole fluid. A pressure sensitive device 251 having its upper or outlet end threadedly secured to the valve body 139 as indicated at 252 functions to provide an electrical signal corresponding to the pressure of the sample fluid in the chamber 245. This pressure sensitive device 251 is in the form of an elongated cylinder extending downwardly through the chamber 245 and having its lower inlet end 253 spaced slightly from the fitting 248. The fluid in the chamber 245 thus enters the inlet end 253 of the pressure sensitive device to develop the electrical signal referred to above for transmission via a circuit illustrated in FIG. 3 and described more fully hereinafter to the surface equipment where it is recorded. This circuit includes an elongated tongue 254 formed on the pressure sensitive device and extending upwardly through a passage 255 in the valve body 139 to form an electrical connection to the terminal 195–6.

A lower or auxiliary sample collecting chamber 258 is preferably located below the chamber 245 and is defined by a cylindrical casing 259 threadedly secured at its upper end to the fitting 248 and threadedly secured at its lower end to a bull plug fitting 260. Sealing rings 261 and 262 are employed to prevent the borehole fluid from entering the auxiliary chamber. A poppet valve 263 is mounted upon the fitting 248 for the purpose of automatically opening the upper sample collecting chamber 245 to the lower sample collecting chamber 258 whenever the pressure in the upper chamber exceeds a predetermined value. The poppet valve is loaded by means of a spring 264 which may be adjusted to alter the pressure at which the poppet valve opens to dump the upper sample collecting chamber 245. Generally, the chamber 258 has a somewhat larger capacity than the chamber 245 and in one embodiment of the invention which has proved successful, a lower sample collecting chamber of five gallon capacity and an upper sample collecting chamber of one gallon capacity were employed. A second auxiliary chamber similar to the auxiliary chamber 258 described above may be disposed below the chamber 258 but this has not been shown in the drawings. The fluid which flows to the sampling punch 174 at the beginning of the sampling operation passes first to the chamber 245 and is then exhausted into the chamber 258 as soon as the valve 263 is opened. When the chamber 258 is filled, the pressure existing on opposite sides of the poppet valve 263 tends to equalize whereupon the spring 264 closes the valve to block the connection between the two chambers. The chamber 245 thus fills and, since the fluid flowing to this chamber near the termination of the sampling operation consists almost exclusively of formation fluid it will be apparent that the sample in this particular chamber represents a much more accurate sample than that collected in the lower chamber 258 which comprises a mixture of formation fluid plus a relatively small amount of borehole fluid filling the hose 180, the passage 193, and the sample punch inlet prior to the beginning of the sample.

When the upper chamber 245 is filled, the sampling operation may be terminated from the surface by passing current to the igniter 197 which, as described above, results in closing the valve 194. With the valve 194 closed, the back-up assembly 148 and the sample punch assembly 163 may be moved to their retracted position by operation of the electric motor 71 and the pump 79 in the manner described above whereupon the tool 20 may be removed from the borehole by reeling in the cable 21. At the surface, the sample in the chamber 245 may be evacuated for analysis by means of a pressure balanced valve 265 mounted within a transverse passageway formed in the fitting 248. The valve is normally retained within this passageway by means of a threaded plug 266 having a head portion 267 accessible from the exterior of the tube. A snap ring 268 limits the movement of the valve toward the right as viewed in FIG. 2F. O-rings 269 and 270 are employed on the valve to prevent the escape of fluid from the chamber 245 until the plug 266 is removed. When the valve 265 is opened, the fluid in the chamber 245 flows through an outlet passage 271 and is collected and analyzed in conventional manner. A similar pressure balanced valve 272 is employed for exhausting any gas collected in the auxiliary or lower sample collecting chamber 258. This valve extends through aligned passages 273 and 274 and through a recess 275 formed in the fitting 248. Here again, the valve is normally retained within the passage by means of a removable plug 276 which may be partially removed to open the valve and permit the escape of gas from the chamber 258 through the passage 274. The fluid in the chamber 258 may be evacuated through a sampling liquid outlet 277 formed in the bull plug fitting 260. The latter outlet opens to a recess 278 defined in the bull plug fitting and is horizontally aligned with a valve receiving passage 279. A valve 280 extends through the recess 278, fits within the passages 277 and 279, and is provided with O-rings 281 and 282 cooperating with the walls of the passages normally to close the bottom of the chamber 258. A removable plug 283 is employed to open the valve 280 for the purpose of draining the fluid in the chamber 258 through the passage 277. Both the liquid passed through the outlet passage 277 and the gas passing through the passage 274 may be collected and analyzed in the usual manner. As in the prior art devices employed for taking fluid samples, the contents of the fluids captured or the absence of captured fluid may be used to determine the nature of the subsurface formations adjacent the borehole. After the sample liquid and the sample gases have been evacuated from the chamber 258, the bull plug fitting 260 may be removed for the purpose of cleaning the interior of the lower sampling chamber. If desired, the fitting 248 may also be removed in order to clean the upper sampling chamber 245.

One form of the pressure sensitive device 251 which may be employed in the apparatus of the present invention is illustrated in FIG. 4 as comprising an external tube 284 connected at its upper end to a terminal mold 285 and threadedly secured at its lower end to a mounting block 286. The block 286 is provided with an internally threaded recess 287 for receiving a plug forming the inlet 253 to the pressure sensitive device. The inlet plug is provided with an annular peripheral groove containing an O-ring 288 seating against the walls of the recess 287 for preventing the entrance of sample fluid except through a fluid passage 289 formed in the center of the plug. The sample fluid acts against the lower end of a piston 290 mounted for sliding movement within the inlet 253. The piston carries a screw which may be removed to fill the interior of the device 251 with a relatively non-compressible fluid. When the piston 290 is moved upwardly by the pressure acting on its lower end, the fluid in the upper end of the recess 287 passes through a fluid carrying passage 291 formed in the block 286 and is delivered to the lower end 292 of a helically formed, pressure responsive Bourdon tube 293.

For the purpose of supporting the component elements of the device 251 within the external tube 284, there is provided an instrument cradle 294 which is seated at its lower end within an annular recess 295 formed in the block 286 and is held in fixed position by means of one or more machine screws 297. The Bourdon tube 293 extends within the instrument cradle 294 and encircles a torque shaft 298 mounted for rotation at its lower end upon a bushing 299 contained within a central recess defined in the block 286. The upper end of the torque shaft 298 is journalled for rotation within a bushing 300 supported centrally of a shaft supporting plate 301 mounted in fixed position upon the instrument cradle 294 in any suitable manner as, for example, by means of machine screws 302. The upper end of the Bourdon tube 293 is connected to a collar 304 fixedly mounted upon the shaft 298 by means of an Allen set screw 303 so that the tube 293 turns the shaft 298 in response to changes in the pressure of the fluid entering the lower end 292.

To develop an electrical signal corresponding to the pressure of the sample fluid acting upon the piston 290 and transmitted to the Bourdon tube, the upper end of the shaft 298 is secured to a rod 305 extending upwardly to drive the operating shaft 306 of a potentiometer 307. More specifically, the rod 305 is connected through a bushing assembly 308 to the lower end of the shaft 306 which protrudes below a potentiometer supporting disc 309 secured to the instrument cradle 294. The potentiometer 307 is, of course, suitably mounted upon the disc 309. The wiper of the potentiometer 307 is connected to ground through a conductor 310 leading to a ground terminal 311 formed on the cradle 294. One end of the winding of the potentiometer is connected via conductor 312 to a terminal screw 313 mounted upon a plug supporting wafer 314 which also carries an upwardly extending banana plug 315. The wafer 314 is mounted in fixed position upon the upper end of the instrument cradle 294 in any suitable manner as, for example, by means of one or more machine screws 316. The banana plug 315 fits into a socket or receptacle 317 mounted within a central opening formed in an insulating plate 318 secured to the terminal mold 285. The upper end of the receptacle 317 is externally threaded to receive a nut 319 which mounts a terminal 320 connected to the lower end of an insulated wire or conductor 321 extending upwardly through the tongue 254 of the pressure sensitive device.

The terminal mold 285 is adapted to seat against the valve body 139 in the manner illustrated in FIG. 2E while the tongue 254 is provided with an elongated axially extending passage for accommodating the conductor 321 which is connected at its upper end to an electrical terminal 322. As previously indicated, the terminal 322 makes electrical connection with the terminal 195–6 mounted on the valve body 139.

In view of the foregoing description it will be recognized that variations in pressure of the sampling fluid in the chamber 245 cause the Bourdon tube 293 to turn the shaft 298 in a direction and magnitude corresponding to the pressure change. The rotation of the shaft 298 is, in turn, transmitted through the rod 305 to the operating arm of the potentiometer 307 with the result that the resistance existing between the terminal 313 and the ground connection 311 is continuously representative of the pressure of the sample fluid in the chamber 245. The terminal 313 is connected in a manner illustrated in FIG. 3 to supply a signal to the surface equipment to record or measure the pressure of the sample fluid.

As was previously indicated, the inlet 253 of the pressure sensitive device 251 may be directly connected to the passage 211 so that the pressure sensitive device functions to measure the pressure of the sample fluid as it enters the sampling punch and prior to its passage through the valve 194. It will be recalled that this connection is made by removing the plug 212 and by connecting a flexible fluid line from the passage 211 to the inlet 253, as is illustrated in FIGS. 7, 8 and 9. As there shown, a fluid coupling 325 is threaded into the uncovered end of the passage 211 and is connected to a line 326 leading to a second coupling 327 connected to the inlet 253. In all other respects, the arrangement shown in FIGS. 7, 8 and 9 is identical to that shown in FIGS. 1 to 6, inclusive, and accordingly, corresponding components have been assigned the same reference characters. The valve 194 is shown in FIG. 7 in its normally closed position with the fluid flow from the sampling punch 174 to the sample collecting chamber 245 being blocked or cut off. In this position of the valve, however, inlet fluid entering the sampling punch passes through the flexible hose 180, through passages 193 and 211 and through the line 326 to the pressure sensitive device 251. The flow of fluid to the pressure sensitive device 251 from the sampling punch 174 is independent of the position of the valve 194 and, as a result, the pressure sensitive device is at all times exposed to any fluid entering the sampling punch. Since any change in pressure of the fluid entering the device 251 is accompanied by a change in resistance as indicated by the surface equipment, it will be apparent that the apparatus illustrated in FIGS. 7, 8 and 9 may be employed either to measure the pressure of the borehole fluid entering the sampling punch 174 prior to extension of the back-up and sampling assemblies 148 and 163 or to measure the pressure of the sample fluid gathered by the sampling punch after the sampling punch assembly has been extended.

The valve 194 is shown in FIG. 8 in its open position after the igniter 196 has been energized to release the plug 203. It will be recalled that the plug 203 is not released until the sampling punch assembly 163 has been extended with the sampling punch 174 penetrating the borehole formation and, hence, the fluid flowing through the hose 180 consists of formation fluids which are passed through the valve 194 to the sample collecting chamber 245. The sample fluid also flows through passage 211 and through line 326 to the inlet 253 of the pressure sensitive device so its pressure is continuously measured and recorded by the surface equipment.

The arrangement for closing the valve 194 after the sample taking operation has been completed is illustrated in FIG. 9 with the plug 233 being shown released after energization of the igniter 197 to close the valve 194 in the manner described above. With the valve closed, fluid flow to the sample collecting chamber 245 is blocked but the fluid from the sampling punch 174 continues to flow to the inlet 253 of the pressure sensitive device with the results described above.

Considering next the operation of the sampling tool 20 and referring particularly to FIG. 3 of the drawings, it will be observed that the schematic diagram there shown illustrates the electrical circuits involved in this operation. The surface equipment 23 is adapted to supply power to the downhole tool, to supply signals controlling the operation of the downhole switching circuits and igniters and to record or measure the signals from the pressure sensitive device 251 and the resistivity signals from the electrodes of the device 217. One of the principal components of the downhole tool is the stepping switch 69 referred to above which is controlled by D.C. signals supplied from the surface equipment and includes a plurality of switch sections 69–1, 69–2, 69–3 and 69–4, each having a movable arm or pole movable into six different switch positions indicated by the six contacts a, b, c, d, e and f on each switch section. This switch is of the type which is advanced one step each time that its energizing coil 337 is supplied with D.C. current and it remains in position between the applications of such current. The poles of the four switch sections are, of course, movable in unison and are moved into engagement with the "a" contacts while the tool is being oriented within the borehole 22. In this position, the three poles of the switch sections 69–2, 69–3 and 69–4 are confronted by an open circuit but the remote electrode 37 is connected through cable conductor 21–6 and through an A.C. filter circuit, which may include an inductor 328 and a condenser 329, to the operating coil of a recording galvanometer 330 in the recording apparatus 26 referred to above. The opposite end of the recording galvanometer coil is connected to a ground electrode indicated at 331 so that the galvanometer 330 functions to record the natural earth or self potential signals transmitted to the surface from the electrode 37. The record produced on the recording medium 27 by the recording galvanometer 330 may be compared with a self potential curve made during a prior logging operation in the borehole 22 in order to position or orient the tool 20 at the desired depth with the sampling punch 174 located directly adjacent the formation of stratum to be investigated as, for example, the stratum 25 illustrated in FIG. 1. In orienting the tool 20, due account must be taken of the spacing between the remote electrode 37 and the sampling punch 174, a spacing which may comprise several feet and in one installation which was found to provide satisfactory results, a spacing of thirteen feet was employed.

After the tool 20 has been located adjacent the formation 25, the operator energizes the downhole stepping switch 69 to step from the "a" position to the "b" position. This stepping action is effected by closing a switch 332 at the surface to supply power from a D.C. source 333, through a switch position indicating instrument 334 via cable conductor 21–2, through pin No. 3 of the quick change connector 35, through an operating coil 335 of an A.C. operated downhole relay 336, through the coil 337 of the stepping switch 69, through pin No. 1 of the quick change connector 35 and through cable conductor 21–1 to the opposite side of the D.C. power source 333. The switch position indicator 334 at the surface indicates continuously the position of the downhole switch 69 so that the operator at the surface is informed of the operating conditions of the downhole tool. When the switch 332 is closed, D.C. current passes through both of the coils 335 and 337 but since the relay 336 is an A.C. operated relay the described flow of D.C. current has no effect on the operation of this particular relay. However, the D.C. current flow through the coil 337 advances the stepping switch 69 from the "a" position to the "b" position whereupon switch sections 69–3 and 69–4 complete a circuit to drive the motor 71 in a forward direction or in a direction to extend the back-up assembly 148 and the sampling punch assembly 163. More specifically, when the stepping switch is moved to the "b" position, a circuit is completed from a suitable source 338 of A.C. power having one side connected to the cable sheath 36 or ground and having its other side connected through a D.C. blocking condenser 339, through cable conductor 21–5, through pin No. 4 of the quick change connector 35, through the normally closed contacts of section 340 of the downhole relay 336, through conductor 341, through the field winding of the motor 71, through the closed contacts of switch section 69–4, through the armature winding of the motor 71 and through the closed contacts of switch section 69–3 to ground. The A.C. current flow via the described path from the source 338, of course, energizes the motor 71 and drives it in a forward direction to rotate the pump 79 in proper direction to extend the back-up assembly 148 and the sampling punch assembly 163 in the manner described above.

In the event that the operator at the surface is dissatisfied with the position of the downhole tool after the sampling punch assembly has been extended he may operate the stepping switch through position "c," through position "d" and into position "e" whereupon the pole of the switch sections 69–3 and 69–4 are moved into engagement with the "e" contacts so that the circuit to the field winding and armature winding of the motor 71 is reversed with the result that this motor turns in the reverse direction to drive the pump 79 in the opposite direction and, hence, to retract the back-up assembly 148 and the sampling punch assembly 163. The position of the tool may then be reset by moving the remote stepping switch 69 to the "a" position to develop a self potential record in the manner described above and by thereafter moving the downhole switch to its second position wherein the poles of the switch section engage the "b" contacts. This procedure may be repeated until the operator is completely satisfied with the orientation of the downhole tool and then the stepping switch may be advanced to the "c" position by again closing the switch 332 at the surface. Movement of the poles of the switch sections 69–3 and 69–4 into engagement with the "c" contacts has no effect on the circuit operation in view of the fact that both the "b" and "c" contacts of these two sections are connected directly together. Movement of the pole of switch section 69–2 into engagement with the "c" contacts, however, completes a circuit to the igniter 196 from the secondary winding 343 of the igniter transformer 98.

More specifically, one side of the secondary winding 343 is connected directly to ground while the other side of this winding is connected through the pole of switch section 69–2, through the closed "c" contact of this switch section, through conductor 100–3 and through terminal 195–3 and to the igniter fuses 199 and 200 to complete the circuit to ground. The primary winding 344 of the igniter transformer 98 has one side connected through the closed contacts of switch section 69–1, through pin No. 6 of the quick change connector 35, through cable conductor 21–6, through a D.C. blocking condenser 345 to one side of an A.C. power source 346 for the igniters. The other side of this power source is connected to a manually operable push button switch 347, through cable conductor 21–4, through the normally closed contacts of section 348 of the downhole relay 336 and through conductor 349 to the primary winding 344. Thus, when the push button switch 347 is depressed by the operator at the surface, A.C. power from the source 346 is applied across the primary winding 344 to energize the igniter 196. Obviously, the stepping switch may be moved to its third position with the poles of the switch sections in engagement with the "c" contacts without completing a circuit to the igniter 196 since this circuit is completed only when the switch 347 is manually depressed. This permits the stepping of the switch 69 during the above described setting and resetting of the downhole tool until the tool is properly oriented.

When the igniter 196 is fired, the valve 194 opens to permit the flow of sample fluid from the sampling punch 174 to the sample collecting chamber 245. While the sample is entering the chamber 245, the pressure sensitive device 251 is effective to send pressure indicating electrical signals to the surface equipment. As indicated above, these signals may represent the pressure of the fluid in the chamber 245 when an arrangement like that shown in FIGS. 1 to 6 and 10 is employed or, in the alternative, these signals may represent the pressure of the sample fluid entering the punch 174 when an arrangement of the type shown in FIGS. 7, 8 and 9 is employed. In order to provide a measurement of the signals developed by the pressure sensitive device 251, a connection is made from terminal 195–6, through conductor 100–6, through conductor 350, through section 351 of the downhole relay 336, through pin No. 5 of the quick change connector 35, through cable conductor 21–3, through a suitable A.C. filter circuit, which may include an inductor 352 and a condenser 353, to a bridge circuit indicated generally by the reference character 354. The bridge circuit is powered by a suitable D.C. source 355 and its four arms comprise resistors 356, 357 and 358 in the surface equipment and the resistance existing between a ground 311 and terminal 195–6 in the downhole tool 20. A recording galvanometer 359 connected across the bridge circuit 354 responds to changes in the potentiometer 307 and develops upon the recording medium 27 a record indicative of the pressure of the fluid as sensed by the pressure sensitive device 251. Whenever the operator at the surface desires to measure the resistivity of the sampling fluid entering the chamber 245 through the electrode holding device 217, a manually operable switch 360 at the surface is closed to connect an A.C. power source 361 through cable conductor 21–3, through pin No. 5 of the quick change connector 35, through conductor 100–2, through terminal 195–2 to the upper current electrode 238. At the same time, the operator actuates a manually operable push button switch 362 to connect one side of a power source 363 through a D.C. blocking condenser 364, through cable conductor 21–22, through pin No. 3 of the quick change connector 35, through the coil 335 of the downhole relay 336, through the coil 337 of the remotely controlled stepping switch 69, through pin No. 1 of the quick change connector 35 and through cable conductor 21–1 to the opposite side of the source 363. The flow of A.C. current over the described path has no effect on the operation of the stepping switch 69 in view of the fact that this switch responds only to D.C. current. However, the flow of A.C current through the coil 335 of the relay 336 moves the poles of the three switch sections 340, 348 and 351 from their normally closed positions illustrated in FIG. 3 to their energized positions. To make the resistivity measurement it is also necessary to close a manually operable switch 360 at the surface to complete a circuit from one side of a measuring current source 361, through cable conductor 21–3, through pin No. 5 of the quick change connector 35 and through conductor 100–2 and terminal 195–2 to the upper current electrode 238. The other side of the source 361 is connected to ground or to the cable sheath 36 through a current responsive coil 368 forming part of a resistivity indicating instrument 366. The lower current ring or electrode 241 is connected through terminal 195–7, through conductor 100–7, through conductor 100–6, through terminal 195–6, through the winding of the potentiometer 307 and through conductor 310 to ground 311. The connection between the conductor 350 and pin No. 5 of the quick change connector 35 is broken when the relay 336 is energized, with the result that the circuit supplying signals to the bridge circuit 354 and to the recording galvanometer 359 is interrupted. Thus, the current from the measuring source 361 is applied between electrode 238 and electrode 241 which is connected to ground through the resistance of potentiometer 307. Since the amount of resistance in this circuit varies, the resistivity of the sample fluid passing through the device 217 is best obtained by measuring the ratio between the difference of potential existing across electrodes 239 and 240 and the current flow between electrodes 238 and 241. To this end, the current flow is sensed by the current passing through the coil 368 in the measuring instrument 366 while the coil 365 senses the difference of potential existing between electrodes 239 and 240. The circuit to the coil 365 is completed when the relay 336 is energized whereupon switch section 340 functions to connect measuring electrode 239 through pin No. 4 of the quick change connector 35 and through cable conductor 21–5. The opposite side of the coil 365 is connected through cable conductor 21–4, through pin No. 2 of the quick change connector 35, through the contacts of switch section 348 and through conductor 100–5 to the measuring electrode 240. Thus, the two coils 365 and 368 respectively respond to the difference of potential between the measuring electrode and to the current flow between the current electrodes with the result that the instrument 366 provides an indication of the resistivity of the sample fluid flowing past the electrodes. This indication may be recorded by the apparatus 26 or may be produced directly on an indicating meter. As soon as the resistivity measurement has been completed, the switches 360 and 362 may be opened so that the contacts of the downhole relay 336 revert to their normally closed position illustrated in FIG. 3.

After the sample collecting chambers 245 and 258 have been filled, the operator at the surface again depresses switch 332 to advance the stepping switch 69 from its third position to its fourth position whereupon the movable poles of the switch sections are moved into engagement with the "d" contacts. Since the movable poles of switch sections 69–3 and 69–4 are confronted by an open circuit when they engage the "d" contacts, the motor 71 is turned off. Movement of the pole of switch section 69–2 into engagement with the "d" contact, however, completes the energizing circuit to the igniter 197 with the result that the fuses 227 and 228 may be fired by depressing the switch 347 to supply an A.C. signal across the primary winding 344 of the igniter transformer 98 in the manner described above. When the igniter 197 is energized, the valve 194 is returned to its closed position to interrupt the fluid circuit from the sampling punch 174 to the sample collecting chamber 245.

In order to move the back-up assembly 148 and the sampling punch assembly 163 to their retracted positions illustrated in FIG. 10, the operator again closes switch 332 to advance the stepping switch 69 from its fourth position to its fifth position whereupon the movable poles of all of the switch sections are moved into engagement with the "e" contacts. As previously described, when the movable poles of switch sections 69–3 and 69–4 are moved into engagement with their "e" contacts, the motor 71 is driven in the reverse direction so that the sampling punch assembly 163 and the back-up assembly 148 are retracted.

In the event that the fluid circuit fails to retract the back-up and punch assemblies, the cable 21 is hoisted to shear the pins 190 so that these assemblies are returned to their retracted position in the manner described above. In any event when the assemblies 148 and 163 have been retracted, the operator again depresses switch 332 to advance the downhole stepping switch 69 from its fifth position to its sixth or off position whereupon the movable poles of all four switch sections are moved into engagement with the "f" contacts and are confronted by open circuits. With the stepping switch 69 in the "off" or sixth position, the downhole tool 20 is removed from the borehole by reeling in the cable 21 and the fluid collected in the chambers 245 and 258 is removed and analyzed in the manner indicated above.

While particular embodiments of the invention have been illustrated and described, it should be recognized that many modifications will occur to those skilled in this art and it is, therefore, contemplated by the appended claims to cover all such modifications as fall within the true spirit and scope of the invention.

What is claimed as new and desired to be secured by Letters Patent of the United States is:

1. In a tool for extracting samples of fluids from formations adjacent a borehole, the combination of a downhole tool; means including a cable connected to said downhole tool for raising and lowering the tool within the borehole; said tool including a sampling assembly movable upon said tool from a retracted position out of engagement with the formations to an extended position in engagement with the formations, selectively operable means for retracting and extending said assembly, the last mentioned means including a reversible electrically operated prime mover, means defining a sampling chamber in said tool, means including a valve for connecting said sampling assembly to said sampling chamber in order to deliver sample fluid from said borehole formations, electrically operated means for controlling the operation of the valve, and means for transmitting separate signals from the surface via said cable to control the direction of operation of said prime mover and for controlling the operation of the valve, whereby said assembly may be repeatedly extended and retracted independently of the valve operation to permit proper orientation of the assembly at the desired borehole depth prior to opening the valve.

2. In a tool for extracting samples of fluids from formations adjacent a borehole, the combination of a downhole tool including a tool housing; means including a cable connected to said downhole tool for raising and lowering the tool within the borehole; said tool including a sampling assembly mounted upon said housing for movement from a retracted position to an extended position in engagement with the borehole formations, a fluid pressure operated system for retracting and extending said assembly, said system including a pump and a piston and cylinder receiving fluid from said pump, a piston rod connected to said piston and extending longitudinally of the tool, means pivotally connecting said sampling assembly to said piston rod, a block mounted for sliding movement longitudinally of the tool housing, means supporting said sampling assembly for pivotal movement about said block, and at least one shear member normally securing said block to said housing and capable of being sheared by an upward vertical pull of predetermined amount on said cable with said sampling assembly extended, thereby to permit said block to fall downwardly by gravity in order to retract the sampling assembly in the event of failure of the fluid pressure operated system.

3. In a tool for extracting samples of formation fluids from formations adjacent a borehole containing fluids, the combination of an elongated downhole tool including a tool housing; means including a cable connected to said downhole tool for raising and lowering the tool within the borehole; said tool including a sampling punch assembly mounted upon said housing for movement from a retracted position to an extended position in engagement with the borehole formations, said assembly including a hollow punch penetrating the borehole formations when the assembly is in extended position and a resilient pad around said hollow punch for sealing the punch from the borehole fluids, a fluid pressure operated system for retracting and extending said assembly, said system including a pump and a piston and cylinder receiving fluid from the pump, a piston rod connected to said piston and extending longitudinally of the tool housing, means pivotally connecting said punch assembly to said piston rod, a block mounted for sliding movement longitudinally of the tool housing, a pair of pantagraph arms each pivotally connected at one end to said block and each pivotally connected at its other end to said punch assembly, and at least one shear member normally securing said block in fixed position upon said housing, said shear member being capable of being sheared by an upward vertical pull of predetermined amount on said cable with said punch assembly extended in order to permit said block to fall downwardly by gravity thereby to retract the punch assembly in the event of failure of the fluid pressure operated system.

4. In a tool for extracting samples of fluids from formations adjacent a borehole, the combination of an elongated downhole tool; means including a cable connected to said downhole tool for raising and lowering the tool within the borehole; said tool including a sampling punch assembly movable from a retracted position to an extended position in engagement with a point on the borehole formations, a back-up assembly movable from a retracted position to an extended position in engagement with the borehole formations at a location spaced from said point in order to seat the sampling punch assembly against the borehole formations, a fluid pressure operated system for simultaneously retracting or extending said assemblies and including a piston and cylinder in said tool, a piston rod connected to said piston and extending longitudinally of the tool, means pivotally connecting both said back-up assembly and said sampling punch assembly to said piston rod, means supporting each of said assemblies for pivotal movement about the tool, a reversible electric motor within said tool, and a pump in said tool driven by said motor and having inlet and outlet connections respectively connected directly to said cylinder on opposite sides of said piston to form a closed system wherein the cylinder functions as a reservoir for fluid circulated by the pump to effect the simultaneous extension or retraction of the back-up and punch assemblies.

5. In a tool for extracting samples of fluids from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, a back-up assembly mounted for movement upon said housing from a retracted position to an extended position in engagement with the borehole formations at a location spaced from said point in order to seat the sampling punch assembly against the borehole formations, a fluid pressure responsive system for simultaneously retracting or extending said assemblies and including a piston and cylinder in said housing, a piston rod connected to said piston and extending longitudinally of the tool, means pivotally connecting both said back-up assembly and said sampling punch assembly to said piston rod, means supporting each of said assemblies for pivotal movement about the housing, a reversible electric motor in said housing, and a pump in said housing driven by said motor for supplying fluid under pressure to said cylinder on one side of said piston when said motor is driven in one direction to effect the simultaneous extension of the back-up and punch assemblies and for supplying fluid under pressure to the opposite side of said piston when the motor is driven in the opposite direction to effect the simultaneous retraction of said assemblies.

6. In a tool for extracting samples of fluid from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, said sampling punch assembly including a hollow punch for penetrating the borehole formations when the punch assembly is in extended position, and a resilient pad disposed around said punch to seat against the borehole wall when the punch assembly is extended, a back-up assembly mounted upon said housing in horizontal alignment with the sampling punch assembly and movable from a retracted position to an extended position in engagement with the borehole formations at a location diametrically opposed to said point, a selectively operable fluid pressure responsive system for simultaneously retracting or extending said assemblies and including a piston and cylinder in said housing, a piston rod connected to said piston and extending longitudinally of the tool, means pivotally connecting both said back-up assembly and said sampling punch assembly to said piston rod, a first pair of pantograph arms each connected at one end for pivotal movement about said housing and each pivotally connected at its other end to said back-up assembly, a second pair of pantograph arms each connected at one end for pivotal movement about said housing and each pivotally connected at its opposite end to said sampling punch assembly, a reversible electric motor in said housing, and means including a pump in said housing driven by said motor and having inlet and outlet connections respectively connected directly to said cylinder on opposite sides of said piston to form a closed system wherein the cylinder functions as a reservoir for fluid circulated by the pump to effect the simultaneous extension or retraction of the back-up and punch assemblies.

7. In a tool for extracting samples of fluids from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, said sampling punch assembly including a hollow punch for penetrating the borehole formations when the punch assembly is in extended position and a resilient pad disposed around said punch to seat against the borehole wall when the punch assembly is extended, a back-up assembly mounted on said housing in horizontal alignment with the sampling punch assembly and movable from a retracted position to an extended position in engagement with the borehole formations at a location spaced from said point in order to force the hollow punch to penetrate the formations, a selectively operable fluid pressure responsive system for simultaneously retracting or extending said assemblies and including a piston and cylinder in said housing, a piston rod connected to said piston and extending longitudinally of the tool, means pivotally connecting both said back-up assembly and said sampling punch assembly to said piston rod, a first pair of pantograph arms each connected at one end for pivotal movement about said housing and each pivotally connected at its other end to said back-up assembly, a second pair of pantograph arms each connected at one end for pivotal movement about said housing and each pivotally connected at its opposite end to said sampling punch assembly, a reversible electric motor supported upon said housing, and means including a pump in said housing driven by said motor for supplying fluid to said cylinder on one side of said piston when said motor is driven in one direction to effect the simultaneous extension of the back-up and punch assemblies and for supplying fluid to said cylinder on the opposite side of said piston when said motor is driven in the opposite direction to effect the retraction of said assemblies.

8. In a tool for extracting samples of fluids from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, said sampling punch assembly including a hollow punch for penetrating the borehole formations when the punch assembly is in extended position, and a resilient pad disposed around said punch to seat against the wall of the borehole when the punch assembly is extended, a fluid pressure responsive system for retracting or extending said punch assembly and including a piston and cylinder in said housing, a piston rod connected to said piston and extending longitudinally of the tool, means pivotally connecting said sampling punch assembly to said piston rod, a pair of pantograph arms each connected at one end for pivotal movement about said housing and each pivotally connected at its other end to said punch assembly, a reversible electric motor supported upon the housing, and means including a pump driven by said motor and having inlet and outlet connections respectively connected directly to said cylinder on opposite sides of said piston to form a closed system wherein the cylinder functions as a reservoir for fluid circulated by the pump to effect the extension or retraction of the punch assembly.

9. In a tool for extracting samples of fluids from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, said sampling punch assembly including a hollow punch for penetrating the borehole formations when the punch assembly is in extended position and a resilient pad disposed around said punch to seat against the walls of the borehole when the punch assembly is extended, a fluid pressure responsive system for retracting or extending said punch assembly and including a piston and cylinder in said housing, a piston rod connected to said piston and extending longitudinally of the tool, means pivotally connecting said sampling punch assembly to said piston rod, a pair of pantograph arms each connected at one end for pivotal movement about said housing and each pivotally connected at its other end to said sampling punch assembly, a reversible electric motor supported upon said housing, and means including a pump on said housing driven by said motor for supplying fluid to said cylinder on one side of said piston when the motor is driven in one direction to effect the extension of the punch assembly and for supplying fluid to the opposite side of said piston when the motor is driven in the opposite direction in order to retract the punch assembly.

10. In a tool for extracting samples of fluids from formations adjacent a borehole, the combination of an elongated downhole tool including a tool housing; means including a cable connected to said downhole tool for raising and lowering the tool within the borehole; said tool including a sampling assembly mounted for movement upon said housing from a retracted position to an extended position in engagement with a point on the borehole formation, a back-up assembly mounted for movement upon said housing from a retracted position to an extended position in engagement with the borehole formations at a location spaced from said point in order to seat said sampling assembly against the borehole formations, a piston and cylinder assembly in said housing; a piston rod connected to said piston and extending longitudinally of the tool, means pivotally connecting both said back-up assembly and said sampling assembly to said piston rod, a first pair of pantograph arms each connected at one end for pivotal movement about said housing and each pivotally connected at its other end to said back-up assembly, a second pair of pantograph arms each connected at one end for pivotal movement about said housing and each pivotally connected at its opposite end to said sampling assembly, a reversible electric motor supported upon the housing, and means including a pump in said housing driven by said motor for supplying fluid under pressure to said cylinder on one side of said piston when said motor is driven in one direction in order to effect the simultaneous extension of the back-up and sampling assemblies and for supplying fluid under pressure to the opposite side of said piston when the motor is driven in the opposite direction in order to effect the simultaneous retraction of the back-up and sampling assemblies.

11. In a tool for extracting samples of fluids from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, said sampling punch assembly including a hollow punch for penetrating the borehole formations when the punch assembly is in extended position, a back-up assembly mounted for movement upon said housing from a retracted position to an extended position in engagement with the borehole formations at a location spaced from said point in order to force the hollow punch to penetrate the borehole formations, means for simultaneously retracting or extending said assemblies and including a piston and cylinder in said housing, a piston rod connected to said piston and extending longitudinally of the tool, means pivotally connecting both said back-up assembly and said sampling punch assembly to said piston rod, means pivotally connecting each of said assemblies to said housing, a reversible electric motor supported upon said housing and supplied with current from the surface via said cable, a pump in said housing driven by said motor and having inlet and outlet connections respectively connected directly to said cylinder on opposite sides of said piston to form a closed system wherein the cylinder functions as a reservoir for fluid circulated by the pump to effect the simultaneous extension or retraction of the back-up and punch assemblies, means defining a sampling chamber in said housing, means including a valve in said housing for connecting said hollow punch to said sampling chamber in order to deliver sample fluid from said borehole formations, electrically operated means for opening and closing said valve, and means for transmitting separate electrical currents from the surface via said cable to said tool to control the direction of operation of said motor and for opening and closing said valve, whereby said motor is operated independently of the valve to permit the sampling punch assembly to be located at any desired depth in the borehole before the valve is opened.

12. In a tool for extracting samples of fluids from formations adjacent a borehole, the combination of an elongated downhole tool including a tool housing; means including a cable connected to said downhole tool for raising and lowering the tool within the borehole; said tool including a sampling punch assembly mounted for movement upon said housing from a retracted position to an extended position in engagement with a point on the borehole formations, said sampling punch assembly including a hollow punch for penetrating the borehole formations when the punch assembly is in extended position, a back-up assembly mounted upon said housing in horizontal alignment with the sampling punch assembly and movable from a retracted position to an extended position in engagement with the borehole formations at a location diametrically opposed to said point, means for simultaneously retracting or extending said assemblies and including a piston and cylinder in said housing, a piston rod connected to said piston and extending longitudinally of the tool, means pivotally connecting both said back-up assembly and said sampling punch assembly to said piston rod, a first pair of pantograph arms each connected at one end for pivotal movement about said housing and each pivotally connected at its other end to said back-up assembly, a second pair of pantograph arms each connected at one end for pivotal movement about said housing and each pivotally connected at its opposite end to said sampling punch assembly, a reversible electric motor in said housing, a pump in said housing driven by said motor and having inlet and outlet connections respectively connected directly to said cylinder on opposite sides of said piston to form a closed system wherein the cylinder functions as a reservoir for fluid circulated by the pump to effect the simultaneous extension or retraction of the back-up and punch assemblies, means defining a sampling chamber in said housing, and means for transmitting an electrical control signal via said cable to control the direction of operation of said motor, whereby the motor may be repeatedly operated to extend and retract the sampling punch assembly until the latter is positioned and extended at the desired borehole depth.

13. In a tool for extracting samples of formation fluids from formations adjacent a borehole containing fluids, the combination of an elongated downhole tool including a tool housing; means including a cable connected to said downhole tool for raising and lowering the tool within the borehole; said tool including a sampling punch assembly mounted upon said housing for movement from a retracted position to an extended position in engagement with a point on the borehole formations, said sampling punch assembly including a hollow punch for penetrating the borehole formations when the punch assembly is in extended position and a resilient pad around said punch to seat against the wall of the borehole when the sampling punch assembly is extended in order to seal the hollow punch from the borehole fluid, a back-up assembly mounted on said housing in horizontal alignment with the sampling punch assembly and movable from a retracted position to an extended position in engagement with the borehole formations at a location diametrically opposed to said point, means for simultaneously retracting or extending said assemblies and including a piston and cylinder in said housing, a piston rod connected to said piston and extending longitudinally of the tool, means pivotally connecting both said back-up assembly and said sampling punch assembly to said piston rod, a block mounted upon said housing for sliding movement longitudinally of the tool, a first pair of pantograph arms each pivotally connected at one end to said block and each pivotally connected at its other end to said back-up assembly, a second pair of pantograph arms each pivotally connected at one end to said block and each pivotally connected at its opposite end to said sampling punch assembly, a reversible electric motor in said housing, a pump in said housing driven by said motor and having inlet and outlet connections respectively connected directly to said cylinder on opposite sides of said piston to form a closed system wherein the cylinder functions as a reservoir for fluid circulated by the pump to effect the simultaneous extension or retraction of the back-up and punch assemblies, at least one shear member normally securing said block to said housing to prevent sliding movement of the block, said member being capable of being sheared by an upward pull of predetermined amount on said cable when said assemblies are extended to permit said block to fall downwardly by gravity in order to retract the back-up and punch assemblies in the event of failure of the fluid pressure responsive system, means defining a first sampling chamber in said housing, means including a first valve on said housing for connecting said hollow punch to said first sampling chamber to deliver sample fluid from said borehole formations, electrically operated means for opening and closing said first valve, a second sampling chamber in said housing disposed below said first chamber, and means including a second valve in said housing for connecting the first chamber to the second chamber, said second valve being automatically opened by the sample fluid in said first chamber in order to open the first chamber to the second chamber; means for transmitting separate electrical currents from the surface via said cable to control the direction of operation of said motor and for opening and closing said first valve, whereby the motor may be operated independently of the first valve to extend and retract the sampling punch assembly until the latter is positioned and extended at the desired borehole depth whereupon the first valve may be opened.

14. In a tool for extracting samples of fluids from formations adjacent a borehole, the combination of a downhole tool; means including a cable connected to said downhole tool for raising and lowering the tool within the borehole; a sampling assembly, a fluid pressure operated system on said tool for moving said sampling assembly from a retracted position out of engagement with the wall of the borehole to an extended position in engagement with the borehole formations, means including a pump driven by a reversible motor in said tool for controlling the operation of said fluid pressure system to retract and extend said assembly, an electrical circuit including a first manually operated circuit maker and breaker for transmitting electrical current from the surface via said cable to said motor in order to control the direction of drive of said motor, means defining a sampling chamber in said tool, means including a valve in said tool for controlling flow of sample fluid from said sampling assembly to said sampling chamber, electrically controlled valve operating means in the tool for controlling the operation of said valve, and an electrical circuit means including a second manually operated circuit maker and breaker for transmitting electrical signals from the surface through said cable to the valve operating means in order to control the operation of said valve, the second circuit maker and breaker being operated independently of the first circuit maker and breaker so that the sampling assembly may be repeatedly extended and retracted without operating the valve until the tool has been accurately located within the borehole.

15. In a tool for extracting samples of fluids from formations adjacent a borehole, the combination of a downhole tool; means including a cable connected to said downhole tool for raising and lowering the tool within the borehole; a sampling assembly on said tool movable from a retracted position out of engagement with the wall of the borehole to an extended position in engagement with the borehole formations, means in said tool for retracting and extending said assembly and including a reversible motor, the extending and retracting means including structure effective when the motor is driven in a first direction to extend the assembly and effective when the motor is driven in the reverse direction to retract the assembly, means including a first manually operated switch for transmitting electrical current from the surface via said cable to said motor to control its direction of operation, means defining a sampling chamber in said tool, means including a valve in said tool for delivering sample fluid from the sampling assembly to said sampling chamber when said sampling assembly has been moved to its extended position and when the valve is opened, electrically controlled valve operating means in the tool for opening and closing said valve, and means including a second manually operated switch for transmitting signals from the surface through said cable to the valve operating means in order to open and close the valve, whereby said manually operated switches may be operated independently to permit the extension and retraction of the assembly until the tool is located at the desired borehole depth, whereupon the assembly may be extended by operating the first switch and the valve may be opened by operating the second switch.

16. In a tool for extracting samples of fluids from formations adjacent a borehole, the combination of a downhole tool; means including a cable connected to said downhole tool for raising and lowering the tool within the borehole, a sampling assembly on said tool movable from a retracted position out of engagement with the wall of the borehole to an extended position in engagement with the borehole formations, means in said tool for retracting and extending said assembly and including electrically operated means for controlling the direction of operation, means for selectively transmitting electrical current from the surface via said cable to said electrically operated means in order to control both the extension and retraction of the assembly from the surface, means defining a sampling chamber in said tool, means including a valve in said tool for delivering sample fluid from said sampling assembly to said sampling chamber when said sampling assembly has been extended and when said valve is opened, electrically controlled valve operating means in the tool for opening and closing said valve, and means for transmitting first and second signals from the surface through said cable to the valve operating means for respectively opening the valve to begin the sampling operation and closing the valve after the sample fluid has entered the sampling chamber.

17. In a tool for extracting samples from formations adjacent a borehole containing borehole fluids, the combination of a tool housing, means including a cable connected to said tool housing for raising and lowering the tool housing within the borehole, a sampling assembly mounted upon said housing, means defining a sample collecting chamber in said housing, means including a valve in said housing for admitting fluid from the sampling assembly to the sample collecting chamber, said valve including a control element movable between a closed position wherein it blocks fluid flow to the sample collecting chamber from the sampling assembly and an open position wherein fluid is admitted from the sampling assembly to the chamber, a first means for admitting borehole fluid to said valve element to move said element from its closed position to its open position to begin the collection of sample fluids from the formations, a second means for admitting borehole fluid to the valve element to move said element from the open position to the closed position at the completion of the sample collection, and means for transmitting separate electrical signals from the surface via said cable to respectively actuate said first and second means so that the beginning and the completion of the sample taking operation is controlled from the surface.

18. In a tool for extracting samples from formations adjacent a borehole containing borehole fluids, the combination of a tool housing, means including a cable connected to said tool housing for raising and lowering the tool housing within the borehole, a sampling assembly mounted upon said housing, means defining a sample collecting chamber in said housing, means including a valve in said housing for admitting fluid from the sampling assembly to the sample collecting chamber, said valve including a valve plunger mounted in a valve cylinder for movement between a closed position wherein it blocks fluid flow to the sample collecting chamber from the sampling assembly and an open position wherein fluid is admitted from the sampling assembly to the chamber, a first means for admitting borehole fluid to said valve cylinder on one side of said plunger to move the latter from its closed position to its open position in order to begin the collection of sample fluids from the formations, a second means for admitting borehole fluid to the valve cylinder on the other side of said plunger to move the latter from the open position to the closed position at the completion of the sample collection, and means for transmitting separate electrical signals from the surface via said cable to respectively actuate said first and second means so that the beginning and the completion of the sample taking operation is controlled from the surface.

19. In a tool for extracting samples from formations adjacent a borehole containing borehole fluids, the combination of a tool housing, means including a cable connected to said tool housing for raising and lowering the tool housing within the borehole, a sampling assembly mounted upon said housing, means defining a sample collecting chamber in said housing, means including a valve in said housing for admitting fluid from the sampling assembly to the sample collecting chamber, said valve including an electric control element movable between a closed position wherein it blocks fluid flow to the sample collecting chamber from the sampling assembly and an open position wherein fluid is admitted from the sampling assembly to the chamber, a spring biasing said element towards its closed position, a first means for admitting borehole fluid to said valve element to move said element against said spring from its closed position to its open position in order to begin the collection of sample fluids from the formations, a second means for admitting borehole fluid to the valve element to permit the pressure of the borehole fluid to cooperate with the spring in moving said element from the open position to the closed position at the completion of the sample collection, and means for transmitting separate electrical signals from the surface via said cable to respectively actuate said first and second means so that the beginning and the completion of the sample taking operation is controlled from the surface.

20. In a tool for extracting samples from formations surrounding a borehole containing fluids, the combination of an elongated, cylindrical tool housing insertable within the borehole, a sampling assembly mounted upon said housing for movement from a retracted position within the housing to an extended position in engagement with the borehole wall, means defining a cylinder within and coaxial with said housing and including top and bottom walls each having a central opening therethrough, a piston mounted for movement within said cylinder and effective to divide the latter into first and second cylinder chambers, a piston rod secured to said piston and extending through the openings in the top and bottom walls of the cylinder, means connecting the sampling assembly to the piston rod to move the assembly to its extended position when the piston is moved in one direction within the cylinder and to move the assembly to its retracted position when the piston is moved in the opposite direction within the cylinder, a pump in said housing having first and second fluid connections, means including a conduit extending from one of said walls through an aperture in the piston for connecting the first connection to the first chamber, means including a plurality of telescoping tubes one of which is secured to the other of said walls and another of which is secured to the piston for connecting the second of said connections to the second chamber, sealing rings disposed within each of the openings in the top and bottom walls and acting against the piston rod to provide fluid seals, and means for admitting borehole fluids to the interior of the tool above and below the top and bottom walls to act upon the sealing rings so as to balance the borehole fluid pressure acting on the piston rod.

21. In a tool for extracting samples of fluids from formations adjacent a borehole, the combination of a downhole tool, means for raising and lowering the tool within the borehole and including a cable having an outer sheath and six inner conductors extending from the surface to the tool, a sampling assembly mounted on said tool for movement from a retracted position out of engagement with the wall of the borehole to an extended position in engagement with the borehole formations, means in said tool for retracting and extending said assembly and including a motor which is reversible to control the extension and retraction of the assembly, a multiple position stepping switch in the downhole tool including a plurality of switch sections, a first circuit including a first manually operated switch at the surface for transmitting D.C. current over a first and second of said cable conductors to advance said stepping switch in sequence between its different positions, a relay in the tool including a plurality of contact sets, a second circuit including a second manually operated switch at the surface for transmitting a first A.C. current from the surface through said first and second conductors to energize said relay, a third circuit for transmitting a second A.C. current from the surface to said motor and including said second conductor and first and second sections of the stepping switch, means for collecting self-potential signals from the earth formations and for transmitting said self-potential signals to the surface via a third of the cable conductors, means defining a sampling chamber in said tool, means including a valve in said tool for connecting said sampling assembly to said chamber to deliver sample fluid from said borehole formations when the valve is opened, the last named means also including an electrode assembly exposed to the sample fluid and including a pair of spaced apart current emitting electrodes and a pair of spaced apart potential electrodes, valve operating means in said tool for opening and closing said valve, a fourth circuit for transmitting a third A.C. current from the surface to the valve operating means and including a third manually operated switch, the third cable conductor and a third of the sections of the stepping switch, means including a variable impedance in the tool for developing an electrical signal corresponding to the pressure of the sample fluid, a fifth circuit for transmitting said electrical signal to the surface and including a fourth of the cable conductors and at least one normally closed set of contacts of said relay, means at the surface responsive to the electrical signal for indicating the pressure of the sample fluid when the relay is deenergized, a sixth circuit for transmitting a fourth A.C. current to the pair of current emitting electrodes and including a fifth and sixth of said conductors and at least one normally open set of contacts of said relay, means connecting one of the potential electrodes to said fourth conductor and connecting the other of the potential electrodes to the cable sheath through the variable impedance, an indicator at the surface responsive to said fourth A.C. current and to the difference of potential between the fourth conductor and the cable sheath for indicating the resistivity of the sample fluid when said relay is energized, and means connecting said stepping switch sections to said third and fourth circuits in such manner that when the stepping switch is actuated by successive closing of said first manually operated switch it steps in sequence from an "off" position wherein the third and fourth circuits are both broken so that the motor and the valve operating means are both deenergized, to a second position wherein the third circuit is completed to drive the motor in a direction to extend the sampling assembly, to a third position wherein said fourth circuit is conditioned to cause the valve operating means to open the valve when said third manually operated switch is closed, to a fourth position wherein said fourth circuit is conditioned to cause the valve operating means to close the valve as soon as the third manually operated switch is closed, and to a fifth position wherein said first and second switch sections are effective to reverse the direction of drive of said motor through said third circuit in order to retract said sampling assembly.

22. In a tool for extracting samples of fluids from formations adjacent a borehole, the combination of a downhole tool, means for raising and lowering the tool within the borehole and including a cable extending from the surface to the tool, a sampling assembly mounted on said tool for movement from a retracted position out of engagement with the wall of the borehole to an extended position in engagement with the borehole formations, means in said tool for retracting and extending said assembly and including a motor which is reversible to control the extension and retraction of the assembly, a multiple position stepping switch in the downhole tool including a plurality of switch sections, a first circuit including a first manually operated switch at the surface for transmitting a first current via said cable to actuate said stepping switch in sequence to its different positions, a relay in the tool including a plurality of contact sets, a second circuit including a second manually operated switch at the surface for transmitting a second current from the surface through said cable to energize said relay, a third circuit for transmitting a third current through the cable from the surface to said motor and including first and second sections of the stepping switch, means defining a sampling chamber in said tool, means including a valve in said tool for connecting said sampling assembly to said chamber when the valve is opened in order to deliver sample fluid from said borehole formations, the last named means also including an electrode assembly exposed to the sample fluid and including a pair of current emitting electrodes and a pair of potential electrodes, valve operating means for opening and closing said valve, a fourth circuit for transmitting a fourth current from the surface through the cable to the valve operating means and including a third manually operated switch, and a third of the sections of the stepping switch, means in the tool for developing a first electrical signal corresponding to the pressure of the sample fluid, a fifth circuit for transmitting said first electrical signal through the cable to the surface and including at least one set of contacts of said relay, means at the surface responsive to the electrical signal for indicating the pressure of the sample fluid whenever the fifth circuit is completed by closing of said one set of contacts, a sixth circuit for transmitting a fifth current through the cable for flow between the pair of current emitting electrodes and including at least one other set of contacts of said relay, a seventh circuit including the potential electrodes for providing a second electrical signal representing the voltage drop across the potential electrodes caused by the current flow between the current emitting electrodes for transmission through the cable to the surface, an indicator at the surface responsive to said fifth current and to the second electrical signal for indicating the resistivity of the sample fluid whenever said sixth circuit is completed through said other set of contacts, and means connecting said stepping switch sections to said third and fourth circuits in such manner that when the stepping switch is actuated by successive closing of said first manually operated switch it steps in sequence from an "off" position wherein the third and fourth circuits are both broken so that the motor and the valve operating means are both deenergized, to a second position wherein the third circuit is completed to drive the motor in a direction to extend the sampling assembly, to a third position wherein said fourth circuit is conditioned to cause the valve operating means to open the valve as soon as said third manually operated switch is closed, to a fourth position wherein said fourth circuit is conditioned to cause the valve operating means to close the valve as soon as the third manually operated switch is closed, and to a fifth position wherein said first and second switch sections are effective to reverse the direction of drive of said motor through said third circuit in order to retract said sampling assembly.

23. In a tool for extracting samples of fluids from formations adjacent a borehole, the combination of a downhole tool, means for raising and lowering the tool within the borehole and including a cable extending from the surface to the tool; a sampling assembly mounted on said tool for movement from a retracted position out of engagement with the wall of the borehole to an extended position in engagement with the borehole formations, means in said tool for retracting and extending said assembly and including a motor which is reversible to control the extension and retraction of the assembly, a multiple position stepping switch in the downhole tool including a plurality of switch sections, a first circuit including a first manually operated switch at the surface for transmitting a first current through said cable to actuate said stepping switch in sequence to its different positions, a second circuit for transmitting a second current from the surface through the cable to said motor and including first and second sections of the stepping switch, means defining a sampling chamber in said tool, means including a valve in said tool for connecting said sampling assembly to said chamber when the valve is open in order to deliver sample fluid from said borehole formations when the sampling assembly has been extended, valve operating means for opening and closing said valve, a third circuit for transmitting a third current from the surface through the cable to the valve operating means and including a second manually operated switch, and a third of the sections of the stepping switch, means in the tool for developing a first electrical signal corresponding to a first characteristic of the sample fluid, means in the tool for developing a second electrical signal corresponding to a second characteristic of the sample fluid, a fourth circuit for transmitting said first electrical signal via said cable to the surface, a fifth circuit for transmitting said second electrical signal via said cable to the surface, means including a relay in the tool controlled from the surface for alternately rendering said fourth and fifth circuits effective to transmit said first and second electrical signals, indicating means at the surface connected to said fourth and fifth circuits for indicating said first and second characteristics, and means connecting said stepping switch sections to said second and third circuits in such manner that when the stepping switch is actuated by successive closing of said first manually operated switch it steps in sequence from an "off" position wherein the second and third circuits are both broken so that the motor and the valve operating means are both deenergized, to a second position wherein the second circuit is completed to drive the motor in a direction to extend the sampling assembly, to a third position wherein the third circuit is conditioned to cause the valve operating means to open the valve as soon as said second manually operated switch is closed, to a fourth position wherein said third circuit is conditioned to cause the valve operating means to close the valve as soon as the third manually operated switch is closed, and to a fifth position wherein said first and second switch sections are effective to reverse the direction of drive of said motor through said second circuit in order to retract said sampling assembly.

24. In a tool for extracting samples of fluids from formations adjacent a borehole, the combination of a downhole tool, means for raising and lowering the tool within the borehole and including a cable extending from the surface to the tool, a sampling assembly mounted on said tool for movement from a retracted position out of engagement with the wall of the borehole to an extended position in engagement with the borehole formations, means in said tool for retracting and extending said assembly and including an electric motor which is reversible to control the extension and retraction of the assembly, a multiple position stepping switch in the downhole tool including a plurality of switch sections, a first circuit including a first manually operated switch at the surface for transmitting a first current over said cable to actuate said stepping switch in sequence to its different positions, a second circuit for transmitting a second current from the surface through the cable to said motor and including first and second sections of the stepping switch, means defining a sampling chamber in said tool, means including a valve in said tool for connecting said sampling assembly to said chamber when the valve is open in order to deliver sample fluid from said borehole formations when the sampling assembly has been extended, valve operating means for opening and closing said valve, a third circuit for transmitting a third current from the surface through the cable to the valve operating means and including a second manually operated switch and a third of the sections of the stepping switch, and means connecting said stepping switch sections to said second and third circuits in such manner that when the stepping switch is actuated by successive closing of said first manually operated switch it steps in sequence from an "off" position wherein the second and third circuits are both broken so that the motor and the valve operating means are both deenergized, to a second position wherein the second circuit is completed to drive the motor in a direction to extend the sampling assembly, to a third position wherein the third circuit is conditioned to cause the valve operating means to open the valve as soon as said second manually operated switch is closed, to a fourth position wherein the fourth circuit is conditioned to cause the valve operating means to close the valve as soon as the second manually operated switch is closed, and to a fifth position wherein said first and second switch sections are effective to reverse the direction of drive of said motor through said second circuit in order to retract said assembly.

25. In a tool for extracting samples of formation fluids from formations adjacent a borehole containing fluids, the combination of an elongated downhole tool including a tool housing; means including a cable connected to said downhole tool for raising and lowering the tool within the borehole; said tool including a sampling punch assembly mounted upon said housing for movement from a retracted position to an extended position in engagement with the borehole formations, said assembly including a hollow punch penetrating the borehole formations when the assembly is in extended position and a resilient pad extending around said hollow punch and having an outer face normally lying substantially flush with the outer end of the hollow punch, said pad being compressible when forced against the borehole walls to permit the punch to extend beyond the outer face of the pad and into the borehole formations, thereby to seal the punch from the borehole fluids, a fluid pressure operated system for retracting and extending said assembly, said system including a pump and a piston and cylinder receiving fluid from the pump, a piston rod connected to said piston and extending longitudinally of the tool housing, means pivotally connecting said punch assembly to said piston rod, a pair of arms each pivotally connected at one end to said punch assembly and respectively mounted adjacent their other ends for pivotal movement about different fixed pivot points on the housing.

26. In a tool for extracting samples of formation fluids from formations adjacent a borehole containing fluids, the combination of an elongated downhole tool including a tool housing; means including a cable connected to said downhole tool for raising and lowering the tool within the boreholes; said tool including a sampling punch assembly mounted upon said housing for movement from a retracted position to an extended position in engagement with the borehole formations, a fluid pressure operated system for retracting and extending said assembly, said system including a pump and a piston and cylinder receiving fluid from said pump, a piston rod connected to said piston and extending longitudinally of the tool housing, means pivotally connecting said punch assembly to said piston rod, and a pair of pantograph arms each pivotally connected at one end to said punch assembly and respectively mounted adjacent their other ends for pivotal movement about different fixed pivot points on the housing.

27. In a tool for extracting samples of formation fluids from formations adjacent a borehole containing fluids, the combination of an elongated downhole tool including a tool housing; means including a cable connected to said downhole tool for raising and lowering the tool within the borehole; said tool including a sampling punch assembly mounted upon said housing for movement from a retracted position to an extended position in engagement with the borehole formations, a backup assembly also mounted for movement upon said housing from a retracted position to an extended position in engagement with the borehole formations, a fluid pressure operated system for retracting and extending said assembly, said system including a pump and a piston and cylinder receiving fluid from the pump, a piston rod connected to said piston and extending longitudinally of the tool housing, means pivotally connecting both said punch assembly and said backup assembly to said piston rod, a pair of pantograph arms for each of said assemblies, one end of each arm being pivotally connected to a different fixed pivot point on said housing and the other end of each arm being pivotally connected to its associated assembly.

28. In a tool for extracting samples from formations surrounding a borehole containing fluids, the combination of an elongated, cylindrical tool housing insertable within the borehole, a sampling assembly mounted upon said housing for movement from a retracted position within the housing to an extended position in engagement with the formations, means defining a cylinder within and coaxial with said housing and including top and bottom walls at least one of which has a central opening therethrough, a piston mounted for movement within said cylinder and effective to divide the latter into first and second cylinder chambers, a piston rod secured to said piston and extending through said opening, means including structure connecting the sampling assembly to the piston rod for moving the assembly to its extended position when the piston is moved in one direction within the cylinder and for moving the assembly to its retracted position when the piston is moved in the opposite direction within the cylinder, a pump in said housing having first and second fluid connections, means including a conduit extending from one of said walls through an aperture in the piston for connecting the first connection to the first chamber, and means including a plurality of telescoping tubes one of which is secured to the other of said walls and another of which is secured to the piston for connecting the second of said connections to the second chamber.

29. In a tool for extracting samples from formations surrounding a borehole containing fluids, the combination of an elongated, cylindrical tool housing insertable within the borehole, a sampling assembly mounted upon said housing for movement from a retracted position within the housing to an extended position in engagement with the formations, means defining a cylinder within and coaxial with said housing and including top and bottom walls each having a central opening therethrough, a piston mounted for movement within said cylinder and effective to divide the latter into first and second cylinder chambers, a piston rod secured to said piston and extending through the openings in the top and bottom walls of the cylinder, means including structure connecting the sampling assembly to the piston rod for moving the assembly to its extended position when the piston is moved in one direction within the cylinder and for moving the assembly to its retracted position when the piston is moved in the opposite direction within the cylinder, a pump in said housing having first and second fluid connections, means including a condiut extending from one of said walls through an aperture in the piston for connecting the first connection to the first chamber, means for connecting the second of said connections to the second chamber, sealing rings disposed within each of the openings in the top and bottom walls and acting against the piston rod to provide fluid seals, and means for admitting borehole fluids to the interior of the tool housing above and below the top and bottom walls to act upon the sealing rings so as to balance the borehole fluid pressure acting on the piston rod.

30. In a tool for extracting samples from formations surrounding a borehole containing fluids, the combination of an elongated, cylindrical tool housing insertable within the borehole, a sampling assembly mounted upon said housing for movement from a retracted position within the housing to an extended position in engagement with the formations, means defining a cylinder within and coaxial with said housing and including top and bottom walls at least one of which has a central opening therethrough, a piston mounted for movement within said cylinder and effective to divide the latter into first and second cylinder chambers, a piston rod secured to said piston and extending through said opening, means including structure connecting the sampling assembly to the piston rod for moving the assembly to its extended position when the piston is moved in one direction within the cylinder and for moving the assembly to its retracted position when the piston is moved in the opposite direction within the cylinder, a pump in said housing having first and second fluid connections, means including a conduit extending from one of said walls through an aperture in the piston for connecting the first connection to the first chamber, and means for connecting the second of said connections to the second chamber.

31. In a tool for extracting samples of fluid from formations adjacent a borehole, a punch assembly of the type which may be extended to penetrate the borehole formations, said assembly comprising a small, rigid support having a support face thereon facing the walls of the borehole, a single hollow punch rigidly secured to and extending outwardly from said support and centrally thereof for penetrating a selected small area of the borehole formations, and a small resilient sealing pad having an inner face seated against the support face on said support and also having a central opening therein through which said hollow punch extends, said resilient pad normally extending outwardly from said support approximately the same distance as said punch and having an outer surface facing the walls of the borehole, said resilient pad being compressible towards said support when its outer face is forced against the borehole walls, thereby to provide a fluid tight seal against the borehole walls and also permitting the outer end of the punch to extend beyond the compressed outer face of the pad to penetrate the formations, said opening being tapered to converge inwardly from the outer face of the pad, thereby to provide space for the pad when the outer face of the pad is forced against the borehole walls to distort the pad.

32. In a tool for extracting samples of fluid from formations adjacent a borehole, a punch assembly of the type which may be extended to penetrate the borehole formations, said assembly comprising a rigid support having a support face thereon facing the walls of the borehole, a hollow punch rigidly secured to and extending outwardly from said support for penetrating the borehole formations, and a small resilient sealing pad having an inner face seated against the support face on said support and also having an opening therein through which said hollow punch extends, said resilient pad normally extending outwardly from said support approximately the same distance as said punch and having an outer surface facing the walls of the borehole, said resilient pad being compressible towards said support when its outer face is forced against the borehole walls, thereby to provide a fluid-tight seal against the borehole walls and also permitting the outer end of the punch to extend beyond the compressed outer face of the pad to penetrate the formations, said opening being tapered to diverge outwardly from the support thereby to provide space for the pad when the outer face of the pad is forced against the borehole walls to distort the pad.

References Cited in the file of this patent

UNITED STATES PATENTS

| | | |
|---|---|---|
| 2,249,815 | Ennis | July 22, 1941 |
| 2,262,655 | Seale | Nov. 11, 1941 |
| 2,313,176 | Shelby | Mar. 9, 1943 |
| 2,441,894 | Mennecier | May 18, 1948 |
| 2,509,608 | Penfield | May 30, 1950 |
| 2,607,222 | Lane | Aug. 19, 1952 |
| 2,688,369 | Broyles | Sept. 7, 1954 |
| 2,802,200 | Schafer et al. | Aug. 6, 1957 |
| 2,821,256 | Boller | Jan. 28, 1958 |
| 2,833,982 | Maly | May 6, 1958 |
| 2,851,107 | Chivens et al. | Sept. 9, 1958 |
| 2,866,109 | Yancey et al. | May 12, 1959 |
| 2,905,247 | Vestermark | Sept. 22, 1959 |
| 2,915,123 | Le Bourg | Dec. 1, 1959 |

UNITED STATES PATENT OFFICE
CERTIFICATE OF CORRECTION

Patent No. 3,079,793                                   March 5, 1963

Jake H. Le Bus et al.

It is hereby certified that error appears in the above numbered patent requiring correction and that the said Letters Patent should read as corrected below.

Column 7, line 37, for "112" read -- 122 --; column 18, line 69, for "21-22" read -- 21-2 --; column 28, line 32, for "an electric" read -- a --.

Signed and sealed this 1st day of October 1963.

(SEAL)
Attest:

ERNEST W. SWIDER                              DAVID L. LADD

Attesting Officer                                    Commissioner of Patents